United States Patent
Zhang et al.

(10) Patent No.: US 12,034,329 B2
(45) Date of Patent: Jul. 9, 2024

(54) DEVICE TO BE CHARGED, AND CHARGING AND DISCHARGING CONTROL METHOD

(71) Applicant: GUANGDONG OPPO MOBILE TELECOMMUNICATIONS CORP., LTD., Dongguan Guangdong (CN)

(72) Inventors: Jialiang Zhang, Dongguan (CN); Hongbin Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 409 days.

(21) Appl. No.: 17/480,562

(22) Filed: Sep. 21, 2021

(65) Prior Publication Data

US 2022/0006312 A1    Jan. 6, 2022

Related U.S. Application Data

(63) Continuation of application No. PCT/CN2019/082563, filed on Apr. 12, 2019.

(51) Int. Cl.
*H02J 7/00* (2006.01)
*H01M 10/44* (2006.01)
(Continued)

(52) U.S. Cl.
CPC ..... *H02J 7/007182* (2020.01); *H01M 10/441* (2013.01); *H02J 7/0016* (2013.01);
(Continued)

(58) Field of Classification Search
USPC ...................................................... 320/103
See application file for complete search history.

(56) References Cited

U.S. PATENT DOCUMENTS

| 5,631,534 A * | 5/1997 | Lewis ................. H01M 10/482 320/118 |
| 2003/0042870 A1 * | 3/2003 | Yau ......................... A61P 29/00 320/117 |

(Continued)

FOREIGN PATENT DOCUMENTS

| CN | 103311562 A | 9/2013 |
| CN | 203339728 U | 12/2013 |

(Continued)

OTHER PUBLICATIONS

The Extended European Search Report Dated Mar. 11, 2022 from European Application No. 19924509.3.

(Continued)

*Primary Examiner* — Samuel Berhanu
(74) *Attorney, Agent, or Firm* — Quarles & Brady LLP

(57) ABSTRACT

A device to be charged and a charging and discharging control method are disclosed. The device to be charged includes: a first battery unit and a second battery unit connected in series; a charging circuit electrically connected to the first battery unit and the second battery unit; a first switch and a second switch electrically connected to the charging circuit, the first battery unit, and the second battery unit; and a control module electrically connected to the charging circuit, the first switch, and the second switch to control the first switch and the second switch according to a received control instruction, to enable the charging circuit to charge the first battery unit and the second battery unit, or enable the charging circuit to charge the second battery unit, wherein a charge rate of the first battery unit is lower than a charge rate of the second battery unit.

20 Claims, 8 Drawing Sheets

(51) Int. Cl.
*H02J 7/34* (2006.01)
*H02J 50/10* (2016.01)
*H01M 4/02* (2006.01)
*H01M 4/133* (2010.01)
*H01M 10/0525* (2010.01)

(52) U.S. Cl.
CPC ............ *H02J 7/0047* (2013.01); *H02J 7/342* (2020.01); *H02J 50/10* (2016.02); *H01M 2004/027* (2013.01); *H01M 4/133* (2013.01); *H01M 10/0525* (2013.01)

(56) References Cited

U.S. PATENT DOCUMENTS

| | | | |
|---|---|---|---|
| 2009/0107743 A1* | 4/2009 | Alston | B60H 1/00428 903/906 |
| 2016/0016483 A1* | 1/2016 | Yasunori | H02J 7/1438 320/162 |
| 2018/0301912 A1 | 10/2018 | Shen et al. | |

FOREIGN PATENT DOCUMENTS

| | | |
|---|---|---|
| CN | 203984052 U | 12/2014 |
| CN | 207251270 U | 4/2018 |
| CN | 108124498 A | 6/2018 |
| CN | 108140906 A | 6/2018 |
| JP | 2018129958 A | 8/2018 |

OTHER PUBLICATIONS

International Search Report and the Written Opinion Dated Jan. 16, 2020 From the International Searching Authority Re. Application No. PCTCN2019082563.

The First Office Action dated Oct. 8, 2023 from Chinese patent application No. 201980092334.7.

* cited by examiner

DEVICE TO BE CHARGED, AND CHARGING AND DISCHARGING CONTROL METHOD

CROSS-REFERENCE TO RELATED APPLICATION

This application is a continuation of International Application No. PCT/CN2019/082563, filed on Apr. 12, 2019, the entire disclosure of which is incorporated herein by reference in their entirety for all purposes.

BACKGROUND OF DISCLOSURE

1. Field of the Disclosure

The present disclosure relates to the field of battery charging and discharging technology, and specifically to a device to be charged and a charging and discharging control method.

2. Description of the Related Art

To increase the overall battery capacity, more and more batteries with different systems are currently considered to be used. For example, a lithium-ion battery containing a silicon negative electrode and a lithium-ion battery containing only a graphite negative electrode are used in series. Since a specific capacity (3700 mAh/g) of the silicon negative electrode is much greater than a specific capacity (372 mAh/g) of the graphite negative electrode, when they both are used in series, the overall battery capacity will be greatly increased.

However, when two different types of batteries are charged in series, the overall charging rate is only determined by the battery with a lower charging rate. Still, taking the lithium-ion battery with the silicon negative electrode and the lithium-ion battery with the graphite negative electrode used in series as an example, since the conductivity of silicon is worse than the conductivity of graphite, the charge rate of the lithium-ion battery with the silicon negative electrode is lower. Currently, a charge rate of the lithium-ion battery with the silicon negative electrode is only available for 1C (wherein C is the battery capacity), while a charge rate of the lithium-ion battery with the graphite anode is available for 3C. Therefore, when they are both used in series, it will affect the overall charging speed of the batteries.

The above-mentioned information disclosed in the background section is only used to enhance understanding of the background of the present disclosure. Therefore, it may include information that does not constitute the prior art known to those ordinarily skilled in the art.

SUMMARY

In view of the above, the present disclosure is to provide a device to be charged and a charging and discharging control method.

Other characteristics and advantages of the present disclosure will become obvious by the following detailed description or be learned by partly practicing the present disclosure.

According to an aspect of the present disclosure, a device to be charged is provided and includes a first battery unit and a second battery unit coupled in series; a charging circuit electrically connected to the first battery unit and the second battery unit; a first switch and a second switch electrically connected to the charging circuit, the first battery unit, and the second battery unit; and a control module electrically connected to the charging circuit, the first switch, and the second switch to control the first switch and the second switch according to a plurality of instructions received to enable the charging circuit to charge the first battery unit and the second battery unit or to enable the charging circuit to charge the second battery unit; wherein a charging rate of the first battery unit is less than a charging rate of the second battery unit.

According to an embodiment of the present disclosure, the first switch is coupled to the first battery unit and the second battery unit in series, and the second switch is coupled to a partial-series-link containing the first switch and the first battery unit, in parallel; the plurality of instructions includes a first control instruction and a second control instruction; the control module is configured to control the first switch to be turned on and the second switch to be turned off to enable the charging circuit to charge the first battery unit and the second battery unit when the first control instruction is received and to control the first switch to be turned off and the second switch to be turned on to enable the charging circuit to charge the second battery unit when the second control instruction is received.

According to an embodiment of the present disclosure, the charging circuit includes a first charging circuit and a second charging circuit, and the control module is configured to enable the first charging circuit or the second charging circuit to charge the first battery unit and the second battery unit when the first control instruction is received and to enable the first charging circuit to charge the second battery unit when the second control instruction is received; wherein the first charging circuit is a direct charging path, and the second charging circuit includes a voltage conversion circuit.

According to an embodiment of the present disclosure, the device to be charged further includes a detection circuit electrically connected to the first battery unit and the second battery unit to detect a voltage of the first battery unit and a voltage of the second battery unit; and an equalization module electrically connected to the first battery unit and the second battery unit to equalize the voltage of the first battery unit and the voltage of the second battery unit; wherein during power supplied to the device to be charged by the second battery unit, when the detection circuit detects the voltage of the first battery unit greater than the voltage of the second battery unit and the voltage of the second battery unit equal to or less than a predetermined first voltage threshold, the control module is further configured to control the equalization module to transfer power in the first battery unit to the second battery unit to enable the voltage of the second battery unit to be greater than the first voltage threshold.

According to an embodiment of the present disclosure, the control module is further configured to control the second battery unit to stop discharging when the voltage of the first battery unit is equal to or less than a predetermined second voltage threshold.

According to an embodiment of the present disclosure, the control module is further configured to control the equalization module to equalize the voltage of the first battery unit and the voltage of the second battery unit to enable the voltage of the first battery unit to be equal to the voltage of the second battery unit after the second battery unit stops discharging.

According to an embodiment of the present disclosure, the device to be charged further includes a detection circuit electrically connected to the first battery unit and the second battery unit to detect a voltage of the first battery unit and a voltage of the second battery unit; and an equalization module electrically connected to the first battery unit and the second battery unit to equalize the voltage of the first battery unit and the voltage of the second battery unit; wherein during charging the first battery unit and the second battery unit simultaneously, when the detection circuit detects the voltage of the second battery unit greater than the voltage of the first battery unit, the control module is further configured to control the equalization module to enable the second battery unit to charge the first battery unit with a low current.

According to an embodiment of the present disclosure, after the charging circuit is cut off from charging the first battery unit and the second battery unit, the control module is further configured to control the equalization module to equalize a voltage of the first battery unit and a voltage of the second battery unit to enable the voltage of the first battery unit to be equal to the voltage of the second battery unit.

According to an embodiment of the present disclosure, the first battery unit is a lithium-ion battery with a silicon negative electrode, the silicon negative electrode includes one or more mixtures of silicon, silicon carbide, and silicon monoxide, or the silicon negative electrode includes a mixture of graphite and one or more of silicon, silicon carbide, and silicon monoxide.

According to an embodiment of the present disclosure, the second battery unit is a lithium-ion battery with a graphite negative electrode.

According to another aspect of the present disclosure, a charging and discharging control method is provided to be applied in a device to be charged including a first battery unit and a second battery unit coupled in series, a charging circuit electrically connected to the first battery unit and the second battery unit, and a first switch and a second switch electrically connected to the charging circuit, the first battery unit, and the second battery unit, wherein the method includes receiving a plurality of control instructions; and controlling the first switch and the second switch according to the plurality of control instructions to enable the charging circuit to charge the first battery unit and the second battery unit or to enable the charging circuit to charge the second battery unit; wherein a charging rate of the first battery unit is less than a charging rate of the second battery unit.

According to an embodiment of the present disclosure, the first switch is coupled to the first battery unit and the second battery unit in series, and the second switch is coupled to a partial-series-link containing the first switch and the first battery unit, in parallel; the plurality of control instructions includes a first control instruction and a second control instruction; and the controlling the first switch and the second switch according to the plurality of control instructions to enable the charging circuit to charge the first battery unit and the second battery unit or to enable the charging circuit to charge the second battery unit includes controlling the first switch to be turned on and the second switch to be turned off to enable the charging circuit to charge the first battery unit and the second battery unit when the first control instruction is received; and controlling the first switch to be turned off and the second switch to be turned on to enable the charging circuit to charge the second battery unit when the second control instruction is received.

According to an embodiment of the present disclosure, the charging circuit includes a first charging circuit and a second charging circuit, and the method further includes enabling the first charging circuit or the second charging circuit to charge the first battery unit and the second battery unit when the first control instruction is received; and enabling the first charging circuit to charge the second battery unit when the second control instruction is received; wherein the first charging circuit is a direct charging path, and the second charging circuit includes a voltage conversion circuit.

According to an embodiment of the present disclosure, the device to be charged further includes an equalization module, and the method further includes during power supplied to the device to be charged by the second battery unit, when a voltage of the first battery unit is greater than a voltage of the second battery unit and the voltage of the second battery unit is equal to or less than a predetermined first voltage threshold, controlling the equalization module to transfer power in the first battery unit to the second battery unit to enable the voltage of the second battery unit to be greater than the first voltage threshold.

According to an embodiment of the present disclosure, enabling the second battery unit to stop discharging when the voltage of the first battery unit is equal to or less than a predetermined second voltage threshold.

According to an embodiment of the present disclosure, the method further includes controlling the equalization module to equalize the voltage of the first battery unit and the voltage of the second battery unit to enable the voltage of the first battery unit to be equal to the voltage of the second battery unit after the second battery unit stops discharging.

According to an embodiment of the present disclosure, the device to be charged further includes an equalization module, and the method further includes during charging the first battery unit and the second battery unit simultaneously, when a voltage of the second battery unit is greater than a voltage of the first battery unit, controlling the equalization module to enable the second battery unit to charge the first battery unit with a low current.

According to an embodiment of the present disclosure, the method further includes after the charging circuit is cut off from charging the first battery unit and the second battery unit, controlling the equalization module to equalize a voltage of the first battery unit and a voltage of the second battery unit to enable the voltage of the first battery unit to be equal to the voltage of the second battery unit.

According to an embodiment of the present disclosure, the first battery unit is a lithium-ion battery with a silicon negative electrode, the silicon negative electrode includes one or more mixtures of silicon, silicon carbide, and silicon monoxide, or the silicon negative electrode includes a mixture of graphite and one or more of silicon, silicon carbide, and silicon monoxide.

According to an embodiment of the present disclosure, the second battery unit is a lithium-ion battery with graphite negative electrode.

According to the device to be charged provided by the embodiment of the present disclosure, which uses different types of batteries in series. In an aspect, the device to be charged can make full use of advantages of large-capacity batteries and maximize energy density of batteries in the device to be charged to meet users' requirements for large-capacity batteries; in another aspect, it also provides users with an option of quick charge to meet users' requirements for quick charge.

It should be understood that the above general description and the following detailed description are only exemplary and cannot limit the present disclosure.

BRIEF DESCRIPTION OF DRAWINGS

By describing its exemplary embodiments in detail with reference to the accompanying drawings, the above and other objectives, features, and advantages of the present disclosure will become more apparent.

DETAILED DESCRIPTION OF EMBODIMENTS

Figure 1:
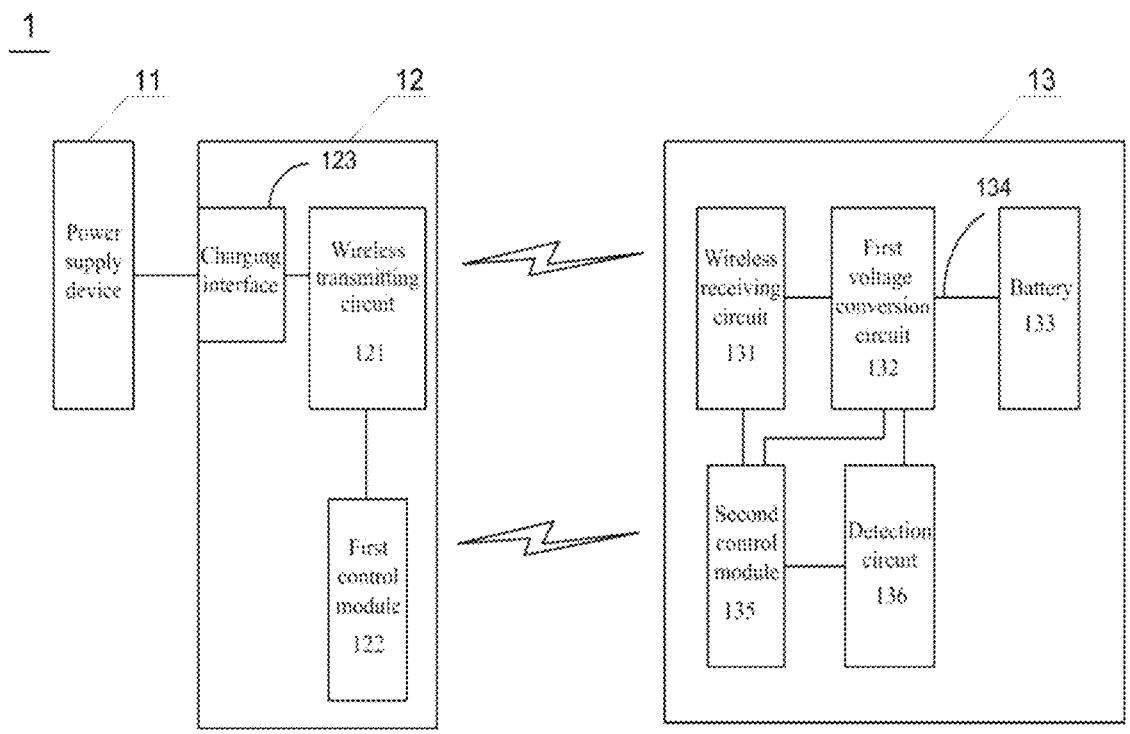
FIG. 1 is a systematic structural diagram showing a wireless charging system according to an exemplary embodiment.

Example embodiments will now be described more fully with reference to the accompanying drawings. However, the example embodiments can be implemented in various forms and should not be construed as being limited to the examples set forth herein; on the contrary, the provision of these embodiments makes the present disclosure more comprehensive and complete and fully conveys the concept of the example embodiments to those skilled in the art. The drawings are only schematic illustrations of the present disclosure and are not necessarily drawn to scale. The same reference numerals in the figures denote the same or similar parts, and thus their repeated description will be omitted.

In addition, the described features, structures, or characteristics can be combined in one or more embodiments in any suitable manner. In the following description, many specific details are provided to give a sufficient understanding of the embodiments of the present disclosure. However, those skilled in the art will realize that the technical solutions of the present disclosure can be practiced by omitting one or more of the specific details, or adopting other methods, components, devices, steps, and the like. In other cases, well-known structures, methods, devices, implementations, or operations are not shown or described in detail in order to avoid overwhelming and obscure all aspects of the present disclosure.

In the present disclosure, unless otherwise clearly defined and defined, the terms "interconnection" and "connection" and other terms should be understood in a broad sense. For example, they may be fixedly connected, detachably connected, or integrated; they may be electrical connection and also be mutual communication; and they can be directly connected or indirectly connected through an intermediate medium. For those ordinarily skilled in the art, the specific meaning of the above-mentioned terms in the present disclosure can be understood according to specific circumstances.

In addition, in the description of the present disclosure, "a plurality of" means at least two, such as two, three, and the like, unless otherwise specifically defined. "And/or" describes an association relationship of associated objects, indicating that there can be three relationships, such as A and/or B, which can indicate an existence of alone A, alone B, and both A and B. The symbol "/" generally indicates the associated objects before and after being in an "or" relationship. The terms "first" and "second" are only used for descriptive purposes and cannot be understood as indicating or implying relative importance or implicitly indicating a number of indicated technical features. Thus, features defined with "first" and "second" may explicitly or implicitly include one or more of these features.

Firstly, current battery charging process is described.

The battery charging process may include trickle charging stage (or mode), constant current charging stage (or mode), constant voltage charging stage (or mode), and supplementary charging stage (or mode). In the trickle charge stage, a fully discharged battery is first pre-charged (i.e., restorative charging). A trickle charging current is usually one-tenth of a constant current charging current. When a battery voltage rises above a trickle charging voltage threshold, a charging current increases and then enters the constant current charging stage. In the constant current charging stage, the battery is charged with a constant current, and a charging voltage rises rapidly. When the charging voltage reaches an expected charging voltage threshold of the battery, the battery will transfer to the constant voltage charging stage. In the constant voltage charging stage, the battery is charged with a constant voltage, and the charging current gradually decreases. When the charging current drops to a set current threshold (the current threshold is usually one-tenth or less than a value of the charging current in the constant current charging stage. Optionally, the current threshold can be tens of milliamps or less), the battery is fully charged. After the battery is fully charged, due to the influence of the battery's self-discharge effect, some current loss will occur. At this time, the battery will enter the supplementary charging stage. In the supplementary charging stage, the charging current is very small, just to ensure that the battery is in a full capacity state.

It should be noted that the constant current charging stage does not require the charging current to remain completely constant. For example, it can generally mean that a peak or average value of the charging current remains unchanged for a period of time. In practice, the constant current charging stage can be performed for charging in a multi-stage constant current charging manner.

The multi-stage constant current charging may have M constant current stages (M is an integer not less than 2). The multi-stage constant current charging starts charging at a first stage with a predetermined charging current. The M constant current stages of the multi-stage constant current charging are executed sequentially from the first stage to the M-th stage. When a previous constant current stage in the constant current stages shifts to a next constant current stage, the current can be reduced. When the battery voltage reaches a charge termination voltage threshold, the previous constant current stage in the constant current stages will shift to the next constant current stage. The current conversion process between two adjacent constant current stages can be gradual or stepwise jumping changes.

Wireless charging systems and wired charging systems in the related art are respectively introduced below.

In a process of wireless charging, a power supply device (such as an adapter) is generally connected to a wireless charging device (such as a wireless charging base). The output power of the power supply device is transmitted to a device to be charged via the wireless charging device in a wireless manner (such as electromagnetic signals or electromagnetic waves) to charge the device to be charged wirelessly.

According to different principles of wireless charging, wireless charging methods are mainly divided into three types: magnetic coupling (or electromagnetic induction), magnetic resonance, and radio waves. Currently, mainstream wireless charging standards include the QI standard, the power matters alliance (PMA) standard, and the alliance for wireless power (A4WP). Both of the QI standard and the PMA standard use magnetic coupling for wireless charging. The A4WP standard uses magnetic resonance for wireless charging.

FIG. 1 is a systematic structural diagram of a wireless charging system according to an exemplary embodiment.

Referring to FIG. 1, a wireless charging system 1 includes a power supply device 11, a wireless charging device 12 and a device to be charged 13. The power supply device 11 may be, for example, a power adapter, a power bank, and the like; the wireless charging device 12 may be, for example, a wireless charging base; and the device to be charged 13 may be, for example, a terminal device.

The power supply device 11 is connected to the wireless charging device 12, and then an output current is transmitted to the wireless charging device 12.

The wireless charging device 12 includes a wireless transmitting circuit 121 and a first control module 122.

The wireless transmitting circuit 121 is used to convert electric energy output by the power supply device 11 into electromagnetic signals (or electromagnetic waves) for transmitting to perform wireless charging for the device to be charged 13. For example, the wireless transmitting circuit 121 may include a wireless transmission drive circuit and a transmitting coil (or a transmitting antenna). The wireless transmission drive circuit is used to convert a direct current output by the power supply device 11 into a high frequency alternating current. The high-frequency alternating current is converted into an electromagnetic signal (or electromagnetic wave) via the transmitting coil or the transmitting antenna and transmits out.

The first control module 122 may be implemented by, for example, a micro control unit (MCU). The first control module 122 may be applied in the wireless charging device 12 and used to perform wireless communication with the device to be charged 13 during the process of wireless charging of the device to be charged 13. Specifically, the first control module 122 may perform wireless communication with the second control module 135 in the device to be charged 13.

In addition, the wireless charging device 12 may further include a charging interface 123. The wireless transmitting circuit 121 can also be used to receive the electrical energy output by the power supply device 11 via the charging interface 123 and generate electromagnetic signals (or electromagnetic waves) according to the electrical energy output by the power supply device 11.

The charging interface 123 may be, for example, a USB 2.0 interface, a Micro USB interface, or a USB TYPE-C interface. In some embodiments, the charging interface 123 may also be a lightning interface or any other type of parallel port or serial port that can be used for charging.

The wireless charging device 12 can communicate with the power supply device 11. For example, the communication can be performed via the charging interface 123, without setting additional communication interfaces or other wireless communication modules, which can simplify implementation of the wireless charging device 12. If the charging interface 123 is a USB interface, the wireless charging device 12 (or the wireless transmitting circuit 121) and the power supply device 13 can communicate based on data lines (such as D+ and/or D− lines) in the USB interface. Another example is that the charging interface 123 is a USB interface (such as a USB TYPE-C interface) that supports a power delivery (PD) communication protocol. The wireless charging device 12 (or the wireless transmitting circuit 121) and the power supply device 11 can communicate based on the PD communication protocol.

In addition, the wireless charging device 12 may also be connected in communication with the power supply device 11 by other communication methods other than the charging interface 123. For example, the wireless charging device 12 may communicate with the power supply device 11 in a wireless manner, such as near field communication (NFC).

The device to be charged 13 may be, for example, a terminal or a communication terminal. The terminal or communication terminal includes but is not limited to being set to be connected via a wired line, such as a public switched telephone network (PSTN) or a digital subscriber line (DSL), a digital cable, direct cable connection, and/or another data connection/network and/or via, for example, cellular network, wireless local area network (WLAN), such as a digital television network of a digital video broadcasting handheld (DVB-H), a satellite network, an amplitude modulation-frequency modulation (AM-FM) broadcast transmitter, and/or a wireless interface of another communication terminal to receive/transmit communication signals. A communication terminal set to communicate via a wireless interface may be referred to as a "wireless communication terminal," a "wireless terminal," and/or a "mobile terminal." Examples of mobile terminals include, but are not limited to, satellite or cellular phones; can be a personal communication system (PCS) terminals that can combine cellular radio phones with data processing, fax, and data communication capabilities; can include radio phones, pagers, personal digital assistant (PDA) with Internet/Intranet access, web browser, notepad, calendar, and/or global positioning system (GPS) receiver; and conventional laptop and/or handheld receiver or other electronic devices including a radiotelephone transceiver. In addition, the terminal can also include, but is not limited to, rechargeable electronic equipment with charging capability, such as electronic book readers, smart wearable devices, mobile power supplies (such as power banks, travel chargers), electronic cigarettes, wireless mice, wireless keyboards, wireless headsets, Bluetooth speakers, and so on.

The device to be charged 13 includes a wireless receiving circuit 131, a battery 133, a first charging channel 134, a second control module 135, and a detection circuit 136.

The wireless receiving circuit 131 is used to receive electromagnetic signals (or electromagnetic waves) transmitted by the wireless transmitting circuit 121 and convert the electromagnetic signals (or electromagnetic waves) into the direct current output by the wireless receiving circuit 131. For example, the wireless receiving circuit 131 may include a receiving coil or a receiving antenna and a rectifying circuit and/or a shaping circuit such as a filtering circuit connected to the receiving coil or the receiving antenna. The wireless receiving circuit 131 converts the electromagnetic signals (or electromagnetic waves) transmitted by the wireless transmitting circuit 121 into the alternating current via the receiving coil or the receiving antenna and rectifies and/or filters the alternating current by a shaping circuit, thereby converting the alternating current into a stable direct current to charge the battery 133.

It should be noted that embodiments of the present disclosure do not specifically limit specific forms of the shaping circuit and forms of the output voltage and the output current of the wireless receiving circuit 131 obtained after being shaped by the shaping circuit.

In addition, in some embodiments, the device to be charged 13 may further include a first voltage conversion circuit 132. The first voltage conversion circuit 132 is disposed on the first charging channel 134 (for example, a wire), and is disposed between the wireless receiving circuit 131 and the battery 133. When the output voltage of the wireless receiving circuit 131 cannot meet an expected charging voltage requirement of the battery 133, and/or the output current of the wireless receiving circuit 131 cannot meet an expected charging current requirement of the battery 133, the output voltage can be converted by the first voltage conversion circuit 132 to obtain the expected charging voltage and/or charging current of the battery 133. For example, the output voltage and the output current of the wireless receiving circuit 131 are input into the first voltage conversion circuit 132 via the first charging channel 134. After the first voltage conversion circuit 132 converts the input voltage, the output voltage and current are applied on both two ends of the battery 133 to meet the expected charging voltage and/or charging current requirements of the battery 133.

The battery 133 may include a single cell or multiple cells. When the battery 133 includes multiple cells, the multiple cells may be coupled in series. As a result, a charging voltage that the battery 133 can withstand is a sum of charging voltages that the multiple cells can withstand. It can increase the charging speed and reduce charging heat.

For example, the device to be charged 13 as a mobile phone is taken as an example. When the battery 133 of the device to be charged 13 includes a single cell, the voltage of the internal single cell is generally between 3.0V and 4.35V. When the battery 133 of the device to be charged 13 includes two battery cells coupled in series, a total voltage of the two battery cells coupled in series is 6.0V to 8.7V. Therefore, comparing to a single cell, when the multiple cells are coupled in series, the output voltage of the wireless receiving circuit 131 can be increased. Comparing to a single cell, to achieve the same charging speed, the charging current required by the multiple cells is about 1/N of the charging current required by the single cell (N is the number of cells coupled in series in the device to be charged 13). In other words, under the premise of ensuring the same charging speed (same charging power), use of a solution of the multiple cells can reduce the charging current, thereby reducing the heat generated by the device to be charged 13 during the charging process. In another aspect, comparing to a solution of the single cell, under the condition that the charging current remains the same, use of the solution of the multiple cells in series can increase the charging voltage, thereby increasing the charging speed.

A second control module 135 may be implemented by, for example, an independent MCU, or may also be implemented by an application processor (AP) inside the device to be charged 13. The second control module 135 is used to communicate with the first control module 122 in the wireless charging device 12. Information such as detected voltage value and/or current value on the first charging channel 134, the remaining power of the battery 133, or a predetermined full-charge time is fed back to the wireless charging device 12. In addition, error information and transmission-terminated information can also be fed back to the first control module 122. Further, the feedback information can also include voltage and/or current adjustment instructions determined by the device to be charged 13 according to the detected information such as the voltage value and/or the current value on the first charging channel 134, the remaining power, or the predetermined full-charge time.

The detection circuit 136 is used to detect the voltage value and/or current value on the first charging channel 134. In some embodiments, when the device to be charged 13 is provided with the first voltage conversion circuit 132, the voltage value and/or current value on the first charging channel 134 may refer to the voltage value and/or current value between the first voltage conversion circuit 132 and the battery 133, i.e., the output voltage and/or output current of the first voltage conversion circuit 132. The output voltage and/or output current is directly applied to the battery 133 to charge the battery 133. Alternatively, the voltage value and/or current value on the first charging channel 134 may also refer to the voltage value and/or current value between the wireless receiving circuit 131 and the first voltage conversion circuit 132, i.e., the output voltage value and/or current value of the wireless receiving circuit 131.

In some embodiments, the detection circuit 136 may include a voltage detection circuit and a current detection circuit.

The voltage detection circuit is used to sample the voltage on the first charging channel 134 and transmit the sampled voltage value to the second control module 135. The voltage detection circuit may, for example, sample the voltage on the first charging channel 134 in a series voltage-division manner.

The current detection circuit is used to sample the current on the first charging channel 134 and transmit the sampled current value to the second control module 135. The current detection circuit may, for example, sample the current on the first charging channel 134 by a current-sense resistor and a galvanometer.

After the first control module 122 receives the information fed back from the device to be charged 13 via the second control module 135, the transmitting power of the wireless transmitting circuit 121 can be adjusted according to the voltage value and/or current value on the first charging channel 134 or according to the above-mentioned voltage and/or current adjustment instructions, thereby the voltage and/or current of the direct current output by the first charging channel 134 matching the charging voltage and/or current required by the battery 133.

It should be understood that the above-mentioned "matching the charging voltage and/or current required by the battery 133" includes the voltage and/or current of the direct current output by the first charging channel 134 and the expected charging voltage and/or current of the battery 133 equal or fluctuating within a predetermined range (for example, the voltage value fluctuates between 100 mV and 200 mV).

Alternatively, after the first control module 122 receives the information fed back from the device to be charged 13 via the second control module 135, the transmitting power of the wireless transmitting circuit 121 can be adjusted according to the voltage value and/or current value on the first charging channel 134 or according to the above-mentioned voltage and/or current value, so that the voltage and/or current of the direct current output by the first charging channel 134 meets the requirements of the battery 133 on charging demand for at least one stage of the above trickle charging stage, constant current charging stage, and constant voltage charging stage.

In addition, as described above, the second control module 135 may also send battery status information to the first control module 122. The battery status information includes a current power and/or a current voltage of the battery 133 in the device to be charged 13. After the battery status information is received, the first control module 122 can first determine a present charging stage of the battery 133 according to the battery status information, and then determine a target output voltage value and/or target charging current value matching the charging stage that the battery 133 currently operates. Then, the first control module 122 may compare the output voltage and/or output current of the first charging channel 134 sent by the second control module 135 with the target output voltage value and/or target charging current value of the determined present charging stage of the battery 133 to determine whether the output voltage and/or output current of the first charging channel 134 matches the determined charging stage that the battery 133 currently operates. If it does not match, the transmitting power of the wireless transmitting circuit 121 is adjusted until the output voltage and/or output current of the first charging channel 134 that is fed back matches the present charging stage of the battery 133.

In addition, as described above, the second control module 135 can directly feed back the detected output voltage and/or output current of the first charging channel 134 to the first control module 121, and can also feed back the adjustment instructions determined according to the detected output voltage and/or output current of the first charging channel 134. The adjustment instructions may be, for example, an instruction to increase or decrease the transmitting power of the wireless transmitting circuit 121. Alternatively, the wireless charging device 12 may also set multiple transmission power levels for the wireless transmitting circuit 121. The first control module 121 adjusts the transmitting power of the wireless transmitting circuit 121 by one level in response to each time that the adjustment instructions are received, until the output voltage and/or output current of the first charging channel 134 that is fed back matches the present charging stage of the battery 133.

The present disclosure does not limit the communication mode and communication sequence between the wireless charging device 12 and the device to be charged 13 (or the first control module 122 and the second control module 135).

In some embodiments, the wireless communication between the wireless charging device 12 and the device to be charged 13 (or the first control module 122 and the second control module 135) may be one-way wireless communication. In the wireless charging process of the battery 133, the device to be charged 13 being an initiator of communication and the wireless charging device 12 being a receiver of communication is taken as an example. For example, in the constant current charging stage of the battery, when the charging current of the battery 133 does not match the current charging stage, the device to be charged 13 can send feedback information or adjustment information to the wireless charging device 12 to instruct the wireless charging device 12 to adjust the transmitting power of the wireless transmitting circuit 121 by the detection circuit 136 implements detection of the charging current of the battery 133 (i.e., the output current of the first charging channel 134).

In some embodiments, the wireless communication between the wireless charging device 12 and the device to be charged 13 (or the first control module 122 and the second control module 135) may be a two-way wireless communication. Two-way wireless communication generally requires a receiver to send response information to an initiator after receiving the communication request initiated by the initiator. The two-way communication base value can make the communication process more secure. In the two-way wireless communication process, anyone party of the wireless charging device 12 and the device to be charged 13 can act as a master device to initiate a two-way communication session. Correspondingly, the other party can act as a slave device make a first response or first reply to the communication initiated by the master device. Further, the master device can make a targeted second response after receiving the first response or the first reply, thereby completing a communication negotiation process between the master device and the slave device.

The targeted second response made by the master device after receiving the first response or the first reply includes that the master device does not receive the first response or the first reply from the slave device for the communication session within a predetermined period of time. In addition, the master device will also make the targeted second response to the first response or first reply of the slave device.

In addition, after the slave device makes the first response or the first reply to the communication session initiated by the master device, it can be that there is no need for the master device to make the targeted second response to the first response or the first reply from the slave device. Namely, a communication negotiation process is considered to be completed between the master device and the slave device.

During the communication between the wireless charging device 12 and the device to be charged 13, the second control module 135 in the device to be charged 13 can couple the feedback information to the receiving coil of the wireless receiving circuit 131 and then send the feedback information to the first control module 122 of the wireless charging device 12.

Alternatively, the device to be charged 13 can also communicate with the wireless charging device 12 by at least one communication methods such as Bluetooth, Wi-Fi, mobile cellular network (such as 2G, 3G, 4G, or 5G), wireless communication (such as IEEE 802.11, 802.15 (WPANs), 802.16 (WiMAX), and 802.20), short-range wireless communication based on high-frequency antenna (such as 60 GHz), optical communication (such as infrared communication), ultrasonic communication, and ultra-wideband (UMB) communication, to send the above feedback information to the wireless charging device 12. It can be understood that when communicating by the above-mentioned communication methods, the device to be charged 13 and the wireless charging device 12 also include corresponding communication modules, such as at least one of a Bluetooth communication module, a Wi-Fi communication module, a 2G/3G/4G/5G mobile communication module, a high-frequency antenna, and an optical communication module, an ultrasonic communication module, an ultra-wideband communication module, and the like. It should be understood that standards applicable to the above-mentioned wireless communication include past and existing standards and also include future versions of these adopted standards and future standards without departing from the scope of the present disclosure. By communicating by the above-mentioned wireless communication methods, the reliability of communication can be improved, thereby improving the safety of charging. Comparing to the related technology (e.g., the Qi standard) in which the feedback information is coupled to the receiving coil of the wireless receiving circuit 131 for communication by signal modulation, the reliability of communication can be improved. It can be avoided that the voltage ripple caused by signal coupling communication, affecting the voltage processing process of the first voltage conversion circuit 132 of the device to be charged 13. In addition, for the voltage ripple when the wireless receiving coil is output, if the ripple is not effectively processed, it may cause wireless charging safety problems and certain safety risks. Communication through the above-mentioned wireless communication methods can eliminate the voltage ripple, thereby eliminating the requirement for using a circuit for processing voltage ripple, reducing the complexity of the charging circuit of the device to be charged 13, improving charging efficiency, saving circuit installation space, and reducing the cost.

The power supply device 11 may be a power supply device with a fixed output power, or a power supply device with adjustable output power. The power supply device with adjustable output power can be provided with a voltage feedback loop and a current feedback loop, so that its output voltage and/or output current can be adjusted according to actual requirements.

As described above, the wireless charging device 12 can continuously adjust the transmitting power of the wireless transmitting circuit 121 during the charging process, so that the output voltage and/or output current of the first charging channel 134 matches the present charging stage of the battery 133.

In some embodiments, the first control module 122 can adjust the amount of power extracted by the wireless transmitting circuit 121 from the maximum output power provided by the power supply device 11, thereby adjusting the transmitting power of the wireless transmitting circuit 121. In other words, the control right to adjust the transmitting power of the wireless transmitting circuit 121 is allocated to the first control module 122. The first control module 122 can adjust the transmitting power of the wireless transmitting circuit 121 by adjusting the output power extracted from the maximum output power after receiving the feedback information of the device to be charged 13, which has the advantages of fast adjustment speed and high efficiency.

For example, a power adjustment circuit may be provided inside the first control module 122, inside the wireless transmission circuit 121, or between the first control module 122 and the wireless transmission circuit 121. The power adjustment circuit may include, for example, a pulse width modulation (PWM) controller and a switch unit. The first control module 122 can adjust the transmitting power of the wireless transmitting circuit 121 by adjusting a duty cycle of the control signal sent by the PWM controller, and/or by controlling the switching frequency of the switch unit.

Alternatively, in other embodiments, the first control module 122 may adjust the output voltage and/or output current of the power supply device 11 by communicating with the power supply device 11 to adjust the transmitting power of the wireless transmitting circuit 121. In other words, the control right to adjust the transmission power of the wireless transmission circuit 121 is allocated to the power supply device 11. The power supply device 11 adjusts the transmitting power of the wireless transmission circuit 121 by changing the output voltage and/or output current. The advantage of this adjustment method is that as much power is required by the wireless charging device 12, the power supply device 11 provides as much power, and there is no waste of power.

It should be understood that similar to the communication method between the wireless charging device 12 and the device to be charged 13, the communication between the wireless charging device 12 (or the first control module 122) and the power supply device 11 may be one-way communication or two-way communication, which is not specifically limited in the present disclosure.

Figure 2:
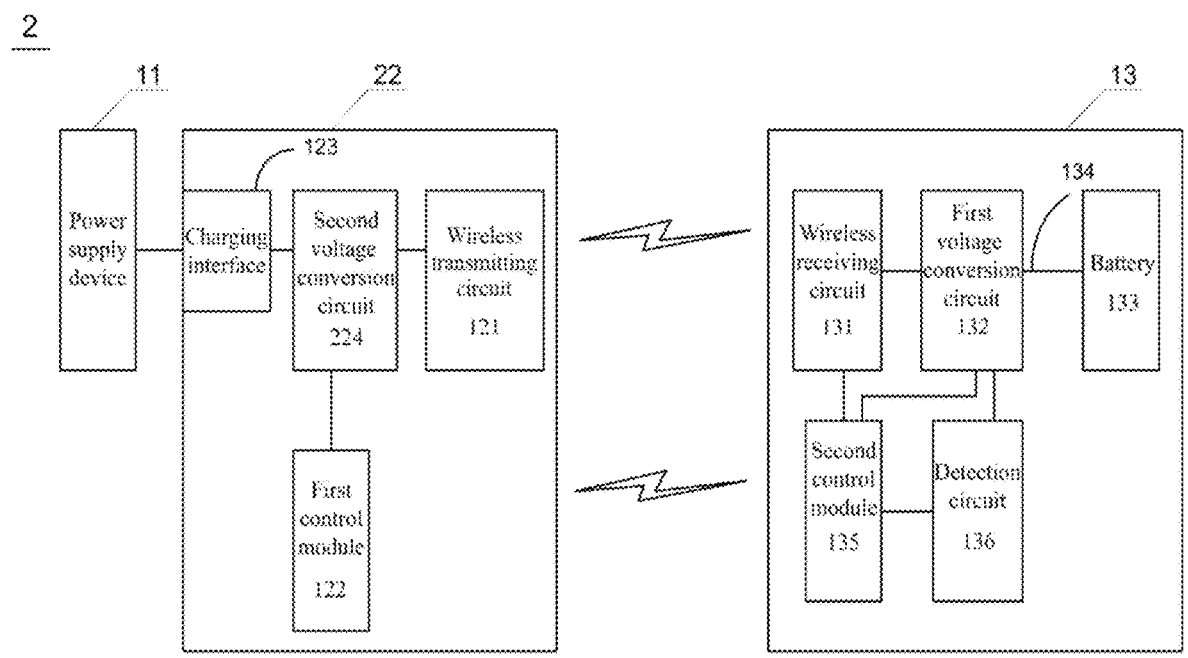
FIG. 2 is a systematic structural diagram showing another wireless charging system according to an exemplary embodiment.

FIG. 2 is a systematic structural diagram of another wireless charging system according to an exemplary embodiment.

Referring to FIG. 2, the difference from the wireless charging system 1 shown in FIG. 1 is that a wireless charging device 22 in a wireless charging system 2 further includes a second voltage conversion circuit 224. The second voltage conversion circuit 224 is provided between the charging interface 123 and the wireless transmitting circuit 121 and can be used to receive the output voltage and output current of the power supply device 11. The wireless transmitting circuit 121 is used to generate electromagnetic signals (or electromagnetic waves) based on the voltage and the current converted by the second voltage conversion circuit 224.

Adjusting the transmitting power of the wireless transmission circuit 121 by the first control module 122 may include that the first control module 122 adjusts the voltage and/or current converted by the second voltage conversion circuit 224 to adjust the transmitting power of the wireless transmission circuit 121.

When the power supply device 11 is a power supply device with fixed output power, the first control module can adjust the output voltage and/or output current of the second voltage conversion circuit 224, thereby adjusting the transmitting power of the wireless transmitting circuit 121. The generality of the wireless charging device 22 is improved to be applicable to an existing ordinary power supply device 11. The second voltage conversion circuit 224 may include, for example, a PWM controller and a switch unit. The first control module may adjust the output voltage and/or output current of the second voltage conversion circuit 224 by adjusting a duty cycle of a control signal sent by the PWM controller and/or by controlling a switching frequency of the switch unit, thereby adjusting the transmitting power of the wireless transmission circuit 121.

Optionally, in some embodiments, the second voltage conversion circuit 224 may receive the output voltage and output current of the power supply device 11 via the charging interface 123. For example, when the power supply device 11 is an ordinary power supply device, the wireless charging device 22 is connected to the ordinary power supply device via the charging interface 123. During wireless charging, the first control module 122 can control the second voltage conversion circuit 224 starts working and adjust the output voltage and/or output current of the second voltage conversion circuit 224 according to the feedback information of the device to be charged 13, so that the transmitting power of the wireless transmitting circuit 121 meets the present charging requirement of the battery 133. This adjustment method also allocates the control right to adjust the transmitting power of the wireless transmitting circuit 121 to the first control module 122. The first control module 122 can immediately control the transmitting power of the wireless transmitting circuit 121 after receiving the feedback information of the device to be charged 13. The adjustment has the advantages of fast adjustment speed and high efficiency.

It should also be understood that the output current of the power supply device 11 may be a constant direct current, a pulsating direct current, or an alternating current, which is not specifically limited in the present disclosure.

The above description is based on the example in which the wireless charging device 12 or 22 is connected to the power supply device 11, and the power can be obtained from the power supply device 11. Still, the present disclosure is not limited to here. The wireless charging device 12 or 22 can also integrate functions similar to an adapter to directly convert the externally input alternating current power (such as commercial power) into the above-mentioned electromagnetic signals (or electromagnetic waves). For example, the functions of the adapter may be integrated in the wireless transmission circuit 121 of the wireless charging device 12 or 22. For example, a rectifier circuit, a primary filter circuit, and/or a transformer may be integrated in the wireless transmission circuit 121. In this way, the wireless transmitting circuit 121 can be used to receive externally input alternating current power (such as 220V alternating current power, or referring to commercial power), and generate electromagnetic signals (or electromagnetic waves) based on the alternating current power. The wireless charging device 12 or 22 integrates functions similar to the adapter, so that the wireless charging device 12 or 22 does not need to obtain power from an external power supply device, which improves the integration of the wireless charging device 12 or 22 and reduces the number of devices required for the wireless charging process.

In addition, the above-mentioned power supply device 11 includes a quick charge type power supply device and a common type power supply device. The maximum output power provided by the quick charge type power supply device is greater than or equal to a predetermined value. The maximum output power provided by the common type power supply device is less than the predetermined value. It should be understood that, in the embodiments of the present disclosure, the quick charge type power supply device and the common type power supply device are only classified by the maximum output power, and other characteristics of the power supply device are not distinguished. In other words, the quick charge type and the normal type can be equivalent to a first type and a second type, respectively. For example, a power supply device with a maximum output power greater than or equal to 20 W may be classified as a quick charge type power supply device, and a power supply device with a maximum output power less than 20 W may be classified as a common type power supply device.

Correspondingly, the wireless charging device 12 or 22 can support a first wireless charging mode and a second wireless charging mode. A charging speed of the wireless charging device 12 or 22 charging the device to be charged 13 in the first wireless charging mode is faster than a charging speed of the wireless charging device 12 or 22 charging the device to be charged 13 in the second wireless charging mode. In other words, comparing to the wireless charging device 12 or 22 operating in the second wireless charging mode, the wireless charging device 12 or 22 operating in the first wireless charging mode to fully charge the same capacity of a battery of the device to be charged 13 spends shorter time.

The first wireless charging mode may be a quick wireless charging mode. The fast wireless charging mode may refer to a wireless charging mode in which the wireless charging device 12 or 22 has a relatively large transmitting power (generally greater than or equal to 15 W).

The second wireless charging mode may be a common wireless charging mode, which may refer to a wireless charging method in which the wireless charging device 12 or 22 has a small transmitting power (generally less than 15 W, and the commonly used transmitting power is 5 W or 10 W). For example, it can be a traditional wireless charging mode based on QI standard, PMA standard, or A4WP standard.

In the common wireless charging mode, it generally takes several hours to charge a large-capacity battery fully (such as a 3000 mAh battery). In contrast, in the quick wireless charging mode, the charging speed is faster, and the charging time required to fully charge a battery of the same capacity can be significantly shortened.

In some embodiments, the first control module 122 and the second control module 135 perform a two-way communication to control the transmitting power of the wireless transmitting circuit 121 in the first wireless charging mode.

In some embodiments, a process of the first control module 122 and the second control module 135 perform a two-way communication to control the transmitting power of the wireless transmitting circuit 121 in the first wireless charging mode, include that the first control module 122 and the second control module 135 performs the two-way communication to negotiate a wireless charging mode between the wireless charging device 12 or 22 and the device to be charged 13.

For example, the first control module 122 conducts handshake communication with the second control module 135. If the handshake communication is successful, the wireless charging device 12 or 22 is controlled to use the first wireless charging mode to charge the device to be charged 13. In the case that the handshake communication fails, the wireless charging device 12 or 22 is controlled to use the second wireless charging mode to charge the device to be charged 13.

Handshake communication can refer to identification of each other's identities by the communicating parties. The successful handshake communication may indicate that the wireless charging device 12 or 22 and the device to be charged 13 both support a wireless charging method with adjustable transmitting power. The failing handshake communication may indicate that at least one of the wireless charging devices 12 or 22 and the device to be charged 13 does not support a wireless charging method with adjustable transmission power.

In the present disclosure, the wireless charging device 12 or 22 does not blindly adopt the first wireless charging mode for quick wireless charging of the device to be charged 13, but performs two-way communication with the device to be charged 13 to negotiate whether the wireless charging device 12 or 22 can use the first wireless charging mode to perform the quick wireless charging of the device to be charged 13, which can improve the safety of the charging process.

In some embodiments, the two-way communication between the first control module 122 and the second control module 135 to negotiate the wireless charging mode between the wireless charging device 12 or 22 and the device to be charged 13 may include, for example, that the first control module 122 sends a first instruction to the second control module 135, wherein the first instruction is used to inquire whether the device to be charged 13 turns on the first wireless charging mode; the first control module 122 receives a reply instruction for the first instruction sent by the second control module 135, wherein the reply instruction is used to indicate whether the device to be charged 13 agrees to turn on the first wireless charging mode; and when the device to be charged 13 agrees to turn on the first wireless charging mode, the first control module controls the wireless charging device 12 or 22 to use the first wireless charging mode for charging the device to be charged 13.

In addition to determining the wireless charging mode based on communication negotiation, the first control module 122 can also select or switch the wireless charging mode according to other factors. For example, the first control module 122 can also control the wireless charging device 12 or 22 to use the first wireless charging mode or the second wireless charging mode for charging the battery 133 according to a temperature of the battery 133. For example, when the temperature is lower than a predetermined low-temperature threshold (such as 5° C. or 10° C.), the first control module 122 may control the wireless charging device 12 or 22 to use the second wireless charging mode for normal charging, and when the temperature is greater than or equal to the low-temperature threshold, the first control module 122 may control the wireless charging device 12 or 22 to use the first wireless charging mode for quick charging. Further, when the temperature is higher than a high-temperature threshold (such as 50° C.), the first control module 122 may control the wireless charging device 12 or 22 to stop charging.

Before introducing a wired charging system, a "normal charging mode" and a "quick charging mode" in the wired charging system are first explained. The normal charging mode means that the adapter outputs a relatively low current value (generally less than 2.5 A) or uses a relatively small power (generally less than 15 W) to charge the battery in the device to be charged. Several hours are usually taken to fully charge a larger-capacity battery (such as a battery with 3000 mAh capacity) in the normal charging mode. Quick charging mode means that the adapter can output a relatively large current (generally greater than 2.5 A, such as 4.5 A, 5 A, or even higher) or use a relatively large power (generally greater than or equal to 15 W) to charge the battery in the device to be charged. Compared with the normal charging mode, a charging speed of the adapter in the quick charging mode is faster, and the charging time required to fully charge the battery of the same capacity can be significantly shortened.

In a wired charging process, a power supply device (such as an adapter) is generally connected to the device to be charged via a cable, and the power provided by the power supply device is transmitted to the device to be charged via the cable to charge the device to be charged.

Figure 3:
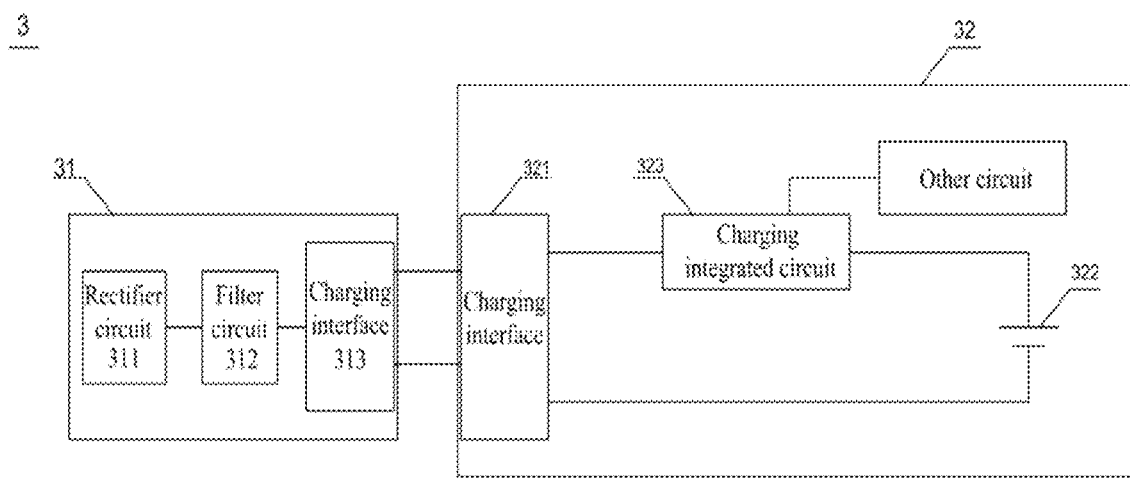
FIG. 3 is a systematic structural diagram showing a wired charging system according to an exemplary embodiment.

FIG. 3 is a systematic structural diagram of a wired charging system according to an exemplary embodiment.

Referring to FIG. 3, the wired charging system 3 includes a power supply device 31 and a device to be charged 32. The power supply device 31 may be, for example, a power adapter, a power bank, etc.; the device to be charged 32 may be, for example, a terminal device.

The device to be charged 32 can be charged by a 10 W (5V/2 A) power supply device 31, that is, the power supply device 31 uses the above-mentioned normal charging mode to charge the device to be charged 32.

The power supply device 31 includes a rectifier circuit 311, a filter circuit 312, and a charging interface 313.

The rectifier circuit 311 is used to convert input alternating current power into direct current power. The filter circuit 312 is used to filter the direct current power output by the rectifier circuit 311 to provide stable direct current power to the device to be charged 32 connected to and via the charging interface 313.

The device to be charged 32 includes a charging interface 321, a battery unit 322, and a charging integrated circuit (IC) 323.

The device to be charged 32 receives electric energy provided by the power supply device 31 via the charging interface 321. The charging interface 321 may be, for example, a USB 2.0 interface, a Micro USB interface, or a USB TYPE-C interface. In some embodiments, the charging interface 123 may also be a lightning interface, or any other type of parallel port or serial port that can be used for charging. The battery unit 322 contains, for example, a single lithium battery cell. A charge cut-off voltage of a single cell is generally 4.2V. Therefore, a charging integrated circuit 323 needs to be configured to convert a voltage of 5V into an expected charging voltage of the battery unit 322.

In addition, the charging integrated circuit 323 can also be used as a conversion circuit to control the charging voltage and/or the charging current of the battery unit 322 during the above-mentioned different charging stages. For example, in the constant current charging stage, the conversion circuit can use a current feedback loop to enable the current entering the battery to meet a first charging current expected by the battery. In the constant voltage charging stage, the conversion circuit can use a voltage feedback loop to enable the voltage applied to both ends of the battery unit 322 to meet the expected charging voltage of the battery. In the trickle charging stage, the conversion circuit can use a current feedback loop to enable the current entering the battery to meet a second charging current expected by the battery (the second charging current is less than the first charging current).

The charging integrated circuit 323 can also obtain battery capacity information of the battery unit 322 to adjust the charging voltage and/or charging current applied on both ends of the battery unit 322 according to the battery capacity information of the battery unit 322. For example, the charging integrated circuit 323 may measure the charging voltage and/or charging current by an electricity meter.

Figure 4:
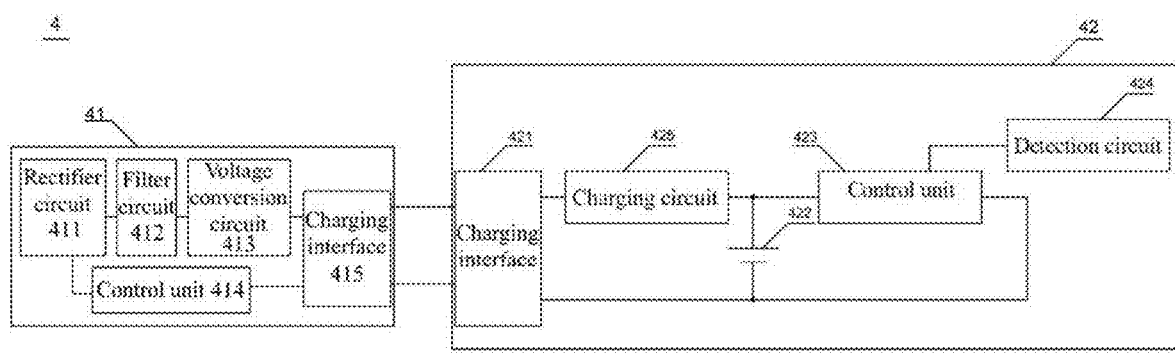
FIG. 4 is a systematic structural diagram showing another wired charging system according to an exemplary embodiment.

FIG. 4 is a systematic structural diagram showing another wired charging system according to an exemplary embodiment.

Referring to FIG. 4, the wired charging system 4 includes a power supply device 41 and a device to be charged 42. The power supply device 41 may be, for example, a power adapter, a power bank, etc.; the device to be charged 42 may be, for example, a terminal device.

The device to be charged 42 can be quickly charged by a 20 W (5V/4 A) high-power power supply device 41. Namely, the power supply device 41 uses the aforementioned quick charging mode to charge the device to be charged 42.

The power supply device 41 includes a rectifier circuit 411, a filter circuit 412, a voltage conversion circuit 413, a first control unit 414, and a charging interface 415.

The rectifier circuit 411 is used to convert input alternating current power into direct current power. The filter circuit 412 is used to filter the direct current power output by the rectifier circuit 411 to provide stable direct current power. The voltage conversion circuit 413 is used to convert the direct current power output from the filter circuit 412. The voltage conversion circuit 413 is generally a buck circuit to provide direct current power with a suitable voltage to the device to be charged 42 connected to and via the charging interface 415. The first control unit 414 is used to receive feedback from the device to be charged 42 to control the voltage and/or current of the direct current output by the rectifier circuit 411. In addition, the first control unit 414 is also used to control the charging voltage and/or charging current of the battery unit 422 of the device to be charged 42 in the above-mentioned different charging stages (such as the constant current charging stage, the constant voltage charging stage, etc.).

In some embodiments, the power supply device 41 can also provide pulsating direct current power to charge the device to be charged 42. The power supply device 41 outputs pulsating direct current. For example, the aforementioned filter circuit 412 can be removed, so unfiltered current output by the rectifier circuit 411 directly supplies power to the device to be charged 42 via the voltage conversion circuit 413 and the charging interface 415. Alternatively, electrolytic capacitors involved in the aforementioned filter circuit 412 can also be removed to realize outputting pulsating direct current.

The device to be charged 42 includes a charging interface 421, a battery unit 422, a second control unit 423, a detection circuit 424, and a charging circuit 425.

The charging circuit 425 is connected to the charging interface 421 and the battery unit 422 for charging the battery unit 422. The charging interface 421 may be, for example, a USB 2.0 interface, a Micro USB interface, or a USB TYPE-C interface. In some embodiments, the charging interface 421 may also be a lightning interface, or any other type of parallel port or serial port that can be used for charging.

Still, the battery unit 422 takes a lithium battery containing a single lithium battery cell as an example. Because there is the voltage conversion circuit 413 in the power supply device 41, the voltage output by the power supply device 41 can be directly applied to both ends of the battery unit 422. The charging circuit 425 uses a direct charging method to charge the battery unit 422. The electric energy output by the power supply device 41 is directly supplied to the battery unit 422 for charging the battery without voltage conversion via the charging circuit 425. Optionally, the charging circuit 425 may be a switch circuit. After the current output by the power supply device 41 passes through the charging circuit 425, the voltage drop slightly changes, thereby no substantial effect on the charging process of the battery unit 422.

The detection circuit 424 is used to detect the voltage value and/or current value between the charging circuit 425 and the battery unit 422, that is, the output voltage and/or output current of the charging circuit 425, wherein the output voltage and/or output current is directly applied on the battery unit 422 to charge the battery unit 422. In addition, the detection circuit 424 may also include an electricity meter for detecting the capacity of the battery unit 422.

The second control unit 423 communicates with the power supply device 41 to transmit the voltage value and/or current value applied on the battery unit 422 and the battery capacity information of the battery unit 422 detected by the detection circuit 424 to the power supply device 41. The second control unit 423 may, for example, communicate with the power supply device 41 via the charging interface 421 without providing an additional communication interface or other wireless communication modules. If the charging interface 421 is a USB interface, the second control unit 423 and the power supply device 41 may communicate based on a data line (such as a D+ and/or D− line) in the USB interface. Further, for example, the charging interface 421 is a USB interface supporting a power transmission (PD) communication protocol (such as a USB TYPE-C interface). The second control unit 423 and the power supply device 41 may communicate based on the PD communication protocol. In addition, the second control unit 423 may also be connected in communication with the power supply device 41 by other communication methods than the charging interface 421. For example, the second control unit 423 may communicate with the power supply device 11 in a wireless manner, such as near field communication.

For a device to be charged that includes a single battery cell, when a larger charging current is used to charge the single battery cell, the heating phenomenon of the device to be charged is more serious. To ensure the charging speed of the device to be charged and alleviate the heating phenomenon of the device to be charged during the charging process, a battery structure can be modified to use multiple cells coupled in series and directly charge the multiple cells. Namely, the voltage output by the adapter is directly applied on two ends of the battery unit containing multiple cells. Compared with the single-cell solution (that is, the capacity of the single-cell before the improvement is the same as the total capacity of the multi-cell coupled in series after the improvement), if the same charging speed is to be achieved, the charging current required by the multi-cell is about 1/N of the charging current required by a single battery cell (N is the number of battery cells coupled in series). In other words, under the premise of ensuring the same charging speed, multiple cells coupled in series can greatly reduce the charging current, thereby further reducing the heat generated by the device to be charged during the charging process.

Figure 5:
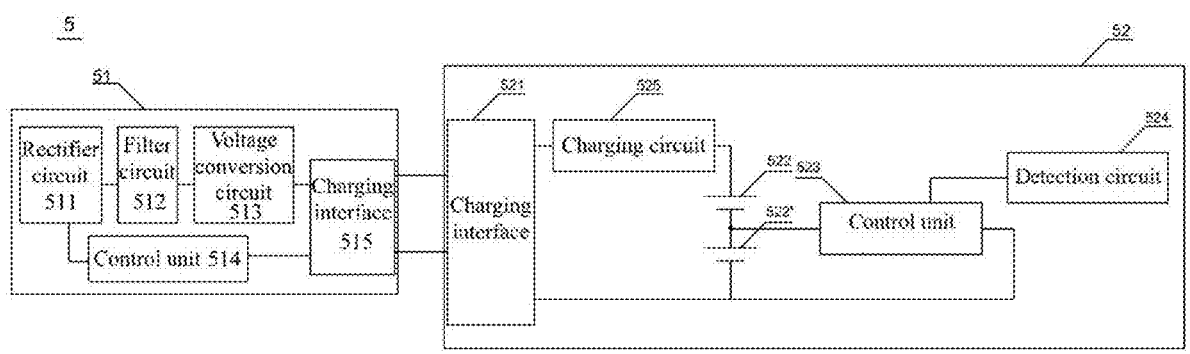
FIG. 5 is a systematic structural diagram showing still another wired charging system according to an exemplary embodiment.

FIG. 5 is a systematic structural diagram showing still another wired charging system according to an exemplary embodiment.

Referring to FIG. 5, the wired charging system 5 includes a power supply device 51 and a device to be charged 52. The power supply device 51 may be, for example, a power adapter, a power bank, etc.; the device to be charged 52 may be, for example, a terminal device.

The device to be charged 52 can be quickly charged by a 50 W (10V/5 A) high-power power supply device 51, that is, the power supply device 51 uses the aforementioned quick charging mode to charge the device to be charged 52.

The power supply device 51 includes a rectifier circuit 511, a filter circuit 512, a voltage conversion circuit 513, a first control unit 514, and a charging interface 515.

The rectifier circuit 511 is used to convert the input alternating current power into direct current power. The filter circuit 512 is used to filter the direct current power output by the rectifier circuit 511 to provide stable direct current power. The voltage conversion circuit 513 is used to convert the direct current power output from the filter circuit 512 to provide direct current power of a suitable voltage to the device to be charged 52 connected to and via the charging interface 515. The first control unit 514 is used to receive feedback from the device to be charged 52 to control the voltage and/or current of the direct current power output by the rectifier circuit 511. In addition, the first control unit 514 is also used to control the charging voltage and/or charging current of the first battery unit 522 and the second battery unit 522' of the device to be charged 52 during the abovementioned different charging stages (such as a constant current charging stage, a constant voltage charging stage, etc.).

In some embodiments, the power supply device 51 can also provide pulsating direct current power to charge the device to be charged 52. The power supply device 51 outputs pulsating direct current. For example, the aforementioned filter circuit 512 can be removed, so that the unfiltered current output by the rectifier circuit 511 passes through the voltage conversion circuit 513 and the charging interface 515 to directly supply power to the device to be charged 52. Alternatively, the electrolytic capacitor involved in the aforementioned filter circuit 512 can also be removed to realize outputting pulsating direct current.

The device to be charged 52 includes a charging interface 521, a first battery unit 522, a second battery unit 522', a second control unit 523, a detection circuit 524, and a charging circuit 525.

The charging interface 521 may be, for example, a USB 2.0 interface, a Micro USB interface, or a USB TYPE-C interface. In some embodiments, the charging interface 521 may also be a lightning interface, or any other type of parallel port or serial port that can be used for charging.

The first battery unit 522 and the second battery unit 522' are connected in series. The first battery unit 522 and the second battery unit 522' are, for example, lithium batteries including a single battery cell. The charging circuit 525 is connected to the charging interface 521 and the first battery unit 522 and the second battery unit 522' connected in series and is used to charge the first battery unit 522 and the second battery unit 522'. The voltage output by the power supply device 51 can be directly applied to two ends of the first battery unit 522 and the second battery unit 522' connected in series. Namely, the charging circuit 525 adopts a direct charging method for charging the first battery unit 522 and the second battery unit 522' coupled in series. It should be noted that because the charging circuit 525 uses a direct charging method to charge the first battery unit 522 and the second battery unit 522' coupled in series, and because line impedance will cause a voltage drop in a charging line, the charging circuit 525 receives the output voltage output by the power supply device 51 needs to be greater than a total voltage of the multiple cells contained in the first battery unit 522 and the second battery unit 522'. In general, an operating voltage of a single cell is between 3.0V and 4.35V. Taking the double cells coupled in series as an example, the output voltage of the power supply device 51 can be set to be greater than or equal to 10V.

It should be noted that when the device to be charged 52 is provided with power by the power supply device 31 or 41 in FIG. 3 or 4, because the output voltage of the power supply device 31 or 41 does not reach 10V, the device to be charged 52 also needs a boost circuit (such as a Boost circuit) to boost the charging voltage applied on the first battery unit 522 and the second battery unit 522'.

The detection circuit 524 is used to detect the voltage value and/or current value between the charging circuit 525 and the first battery unit 522 and the second battery unit 522', i.e., the output voltage and/or output current of the charging circuit 525. The output voltage and/or output current is directly applied on the first battery unit 522 and the second battery unit 522' to charge the first battery unit 522 and the second battery unit 522'. In addition, the detection circuit 524 may further include an electricity meter for detecting the capacity of the first battery unit 522 and the second battery unit 522'.

The second control unit 523 communicates with the power supply device 51 to transmit the voltage value and/or current value applied on the first battery unit 522 and the second battery unit 522' and battery capacity information of the first battery unit 522 and the second battery unit 522' detected by the detection circuit 524 to the power supply device 51. For example, the second control unit 523 can communicate with the power supply device 51 via the charging interface 521 without setting an additional communication interface or other wireless communication modules. If the charging interface 521 is a USB interface, the second control unit 523 and the power supply device 51 may communicate based on a data line (such as a D+ and/or D− line) in the USB interface. Further, for example, if the charging interface 521 is a USB interface supporting a power transmission (PD) communication protocol (such as a USB TYPE-C interface), the second control unit 523 and the power supply device 51 may communicate based on the PD communication protocol. In addition, the second control unit 523 may also be connected in communication with the power supply device 51 by other communication methods than the charging interface 521. For example, the second control unit 523 may communicate with the power supply device 51 in a wireless manner, such as near field communication.

As mentioned above, the silicon anode will be a development direction to increase the energy density of lithium-ion batteries at an anode level in the future. In order to increase the overall capacity of the battery, the silicon negative electrode lithium-ion batteries can be combined with other lithium-ion batteries (such as currently commonly used graphite negative lithium-ion batteries). However, due to the poor conductivity of silicon itself, the charge rate of lithium-ion batteries containing silicon negative electrodes is low. When a silicon negative electrode lithium-ion battery is charged with other high charge rate lithium-ion batteries in series, the overall charge rate is only determined by the lower charge rate of silicon negative electrode lithium-ion battery, which cannot meet users' requirements for quick charging.

To solve the above-mentioned problems, the present disclosure provides a device to be charged, which can further provide users with an option for quick charging based on increasing the overall battery capacity to meet the users' requirements for quick charging.

Figure 6:
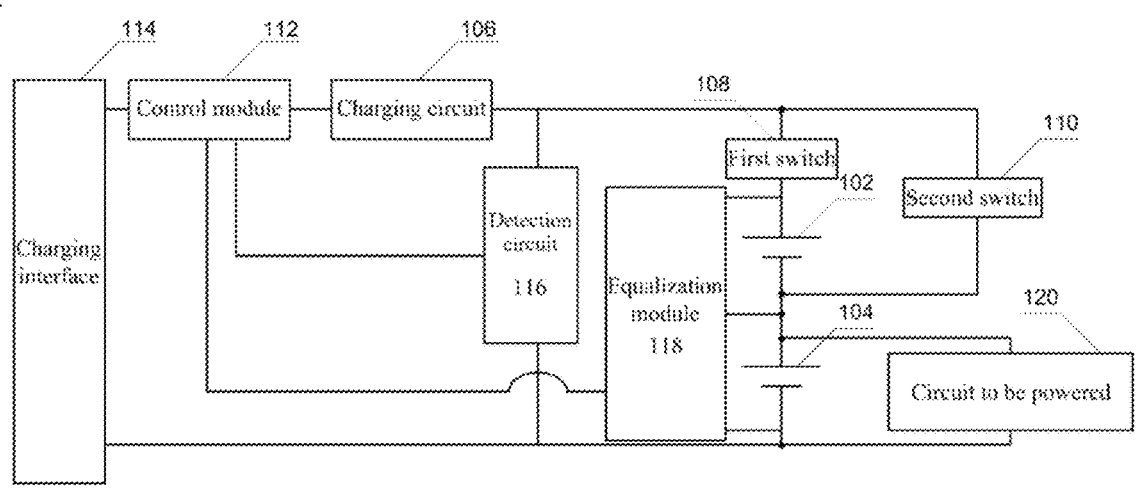
FIG. 6 is a schematic structural diagram showing a device to be charged according to an exemplary embodiment.

FIG. 6 is a schematic structural diagram showing a device to be charged according to an exemplary embodiment.

Referring to FIG. 6, the device to be charged 10 includes a first battery unit 102 and a second battery unit 104 connected in series, a charging circuit 106, a first switch 108, a second switch 110, and a control module 112.

A charging rate of the first battery unit 102 is lower than a charging rate of the second battery unit 104.

In some embodiments, the first battery unit 102 may be, for example, a lithium-ion battery with a silicon negative electrode, and the second battery unit 104 may be, for example, a lithium-ion battery with a graphite negative electrode. For example, the silicon negative electrode may include one or more mixtures of silicon, silicon carbide, and silicon monoxide, or the silicon negative electrode may include a mixture of graphite and one or more of silicon, silicon carbide, and silicon monoxide.

Each of the first battery unit 102 and the second battery unit 104 may include a single cell or multiple cells.

The charging circuit 106 is electrically connected to the charging interface 114, the first battery unit 102, and the second battery unit 104 for charging the first battery unit 102 and the second battery unit 104.

It should be noted that the device to be charged shown in FIG. 6 is drawn by using the above-mentioned wired charging mode as an example, but those skilled in the art should understand that the device to be charged provided in the embodiments of the present disclosure may also use wireless charging technology to charge the first battery unit 102 and the second battery unit 104. When the wireless charging mode is adopted, the charging interface 114 electrically connected to the charging circuit 106 can be replaced with the wireless receiving circuit 131 as shown in FIG. 1 or FIG. 2.

The first switch 108 and the second switch 110 are electrically connected to the charging circuit 106, the first battery unit 102 and the second battery unit 104.

The control module 112 is electrically connected to the charging circuit 106, the first switch 108, and the second switch 110, and is used to control the first switch 108 and the second switch 110 according to a plurality of control instructions received, to enable the charging circuit 106 to charge the first battery unit 102 and the second battery unit 104, or to enable the charging circuit 106 to charge the second battery unit 104.

For example, as shown in FIG. 6, the first switch 108 is connected to the first battery unit 102 and the second battery unit 104 in series, and the second switch 110 is coupled to a partial-series-link containing the first switch 108 and the first battery unit 102, in parallel. When the first switch 108 is turned on and the second switch 110 is turned off, the charging circuit 106 can charge the first battery unit 102 and the second battery unit 104. When the first switch 108 is turned off and the second switch 110 is turned on, the charging circuit 106 only charges the second battery unit 104. Because the charging rate of the second battery unit 104 is high, the charging circuit 106 only charges the second battery unit 104, increasing the charging speed of the device to be charged 10.

The control instruction may be, for example, a control instruction sent by the user through a user interface of a charging configuration provided by the device to be charged 10. If the user wants to obtain a larger battery capacity and chooses the normal charging mode, the user can make a configuration through the user interface to enable the control module 112 to receive the normal charging instruction (such as the first control instruction). The control module 112 controls the first switch 108 to be turned on and the second switch 110 to be turned off so that the charging circuit 106 can charge the first battery unit 102 and the second battery unit 104. If the user wants to charge quickly and chooses the quick charging mode, the user can make a configuration through the user interface to enable the control module 112 to receive the fast-charging instruction (such as the second control instruction). The control module 112 controls the first switch 108 to be turned off and the second switch 110 to be turned on, so that the charging circuit 106 only charges the second battery unit 104. Because the charging rate of the second battery unit 104 is high, the charging circuit 106 only charges the second battery unit 104, which can improve the charging speed of the charging device 10 to meet users' requirements for quick charging.

Figure 7:
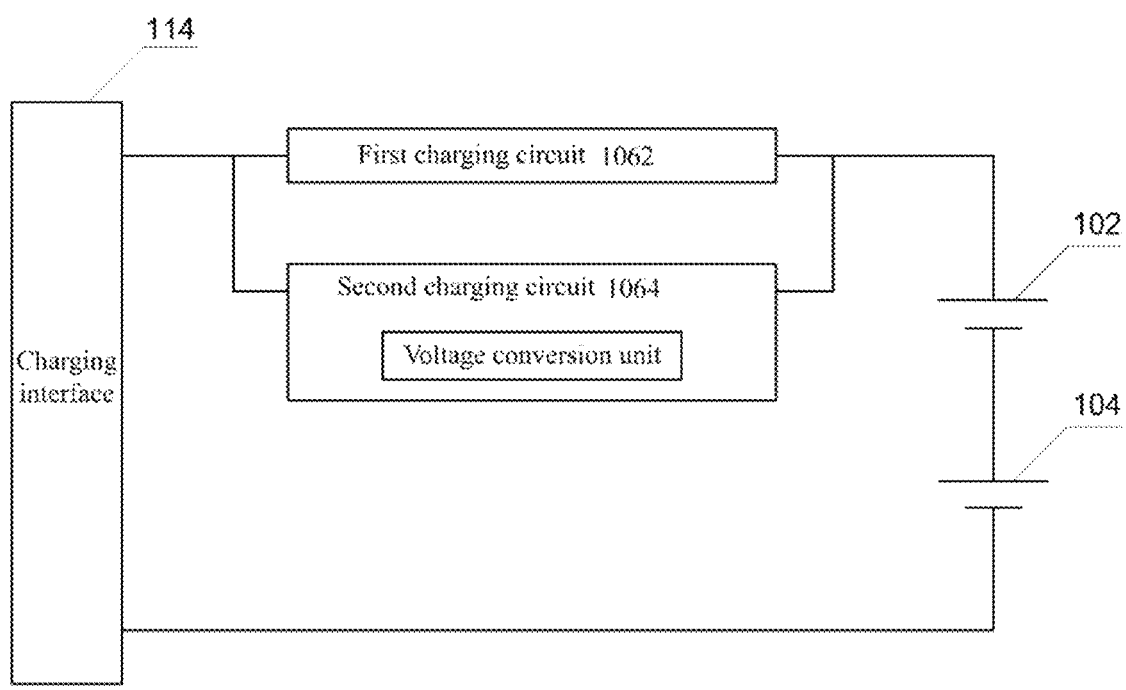
FIG. 7 is a schematic structural diagram showing another device to be charged according to an exemplary embodiment.

FIG. 7 is a schematic structural diagram showing another device to be charged according to an exemplary embodiment. To simplify the illustration, FIG. 7 only illustrates the charging circuit 106, the first battery unit 102, the second battery unit 104, and the charging interface 114. The charging circuit 106 includes a first charging circuit 1062 and a second charging circuit 1064.

Still, taking the wired charging system shown in FIG. 4 or FIG. 5 as an example, when the first battery unit 102 and the second battery unit 104 are charged, if the power supply device can support direct charging of a battery with two cells coupled in series (such as the power supply device 51 with an output voltage of 10V shown in FIG. 5), the control module 112 can control the first charging circuit 1062 (i.e., a direct charging path) to directly charge the first battery unit 102 and the second battery unit 104. In addition, if the power supply device does not support the direct charging of the battery with two cells coupled in series (such as the power supply device 41 with an output voltage of 5V shown in FIG. 4), the control module 112 can control the second charging circuit 1064 to charge the first battery unit 102 and the second battery unit 104. The second charging circuit 1064 may include a voltage conversion unit (such as a boost circuit), which boosts the charging voltage applied to the first battery unit 102 and the second battery unit 104 to meet the charging voltage requirement of the battery with two cells coupled in series.

When only the second battery unit 104 is charged, the control module 112 can control the first charging circuit 1062 to directly charge the second battery unit 104.

Further, when only the second battery unit 104 is charged, after the second battery unit 104 is fully charged, if the device to be charged 10 is still connected to the power supply device, the control module 112 can also control the first switch 108 to be turned on and the second switch 110 to be turned off, to further charge the first battery unit 102.

Continuing to refer to FIG. 6, the second battery unit 104 is electrically connected to a circuit to be powered 120 in the device to be charged 10 and is used to supply power to the device to be charged 10. The device to be charged 10 further includes a detection circuit 116 and an equalization module 118.

The detection circuit 116 is electrically connected to the first battery unit 102 and the second battery unit 104 for detecting the voltage of the first battery unit 102 and the voltage of the second battery unit 104. The structure and working principle of the detection circuit 506 can be referred to the detection circuits in the above-mentioned charging systems, which will not be repeated here.

The equalization module 118 is electrically connected to the first battery unit 102 and the second battery unit 104 for equalizing the voltage between the first battery unit 102 and the second battery unit 104.

The equalization module 118 may, for example, use a capacitive coupling method to equalize the voltage between the first battery unit 102 and the second battery unit 104, or may also use an electromagnetic coupling method to equalize the voltage between the first battery unit 102 and the second battery unit 104. However, the present disclosure is not limited to this. Those skilled in the art should understand that the equalization module 118 may be any equalization circuit suitable for equalizing the voltages of multiple battery units.

In addition, still taking the first battery unit 102 as a lithium-ion battery with a silicon negative electrode and the second battery unit 104 as a lithium-ion battery with a graphite negative electrode as an example, because the first battery unit 102 and the second battery unit 104 are charged at the same time, a voltage rising rate of the second battery unit 104 (the lithium-ion battery with the graphite negative electrode) is usually higher than that of the first battery unit 102 (the lithium-ion battery with the silicon negative electrode). To speed up the overall charging speed, the voltage of the lithium-ion battery with the silicon negative electrode is slowly approached to the lithium-ion battery with the graphite negative electrode. When the detection circuit 116 detects that the voltage of the second battery unit 104 is greater than the voltage of the first battery unit 102, the control module 112 can control the equalization module 118 to enable the second battery unit 104 to charge the first battery unit 102. For example, the second battery unit 104 can be used to charge the first battery unit 102 with a low current. Namely, while the second battery unit 104 receives the power provided by the power supply unit, the second battery unit 104 also charges the first battery unit with a low current via the equalization module 118. During the charging process, the first battery unit 102 can simultaneously receive the power provided by the power supply device and the second battery unit 104. The aforementioned low current does not exceed the maximum discharge current of the second battery unit 104, and a sum of the low current and the charging current provided by the power supply device for the first battery unit 102 does not exceed the maximum charge current that the first battery unit 102 can withstand.

When the detection circuit 116 detects the voltage of the first battery unit 102 greater than the voltage of the second battery unit 104 and the voltage of the second battery unit 104 equal to or less than a predetermined first voltage threshold, the control module 112 is also used to control the equalization module 118 transfers the power in the first battery unit 102 to the second battery unit 104 to enable the voltage of the second battery unit 104 to be greater than the first voltage threshold.

A protection shutdown voltage set by a current smart terminal system is 3.4V. Generally, because the minimum voltage of an operation of software set by a system platform is 3.2V, but if in high current application scenarios, the instantaneous voltage will be greatly reduced to 3.2V or even below 2.8V, thereby affecting the normal operation of the software. Therefore, for example, the first voltage threshold may be set to 3.4V, which is the protection shutdown voltage set by the current smart terminal system, but the present disclosure is not limited to this, and the first voltage threshold can be set according to actual requirements in the application.

When the voltage of the second battery unit 104 is greater than the first voltage threshold, the second battery unit 104 normally supplies power. As mentioned above, the second battery unit 104 is, for example, a traditional lithium-ion battery with a graphite negative electrode. In the device to be charged 10, the second battery unit 104 is connected to the circuit to be powered 120 inside the device to be charged 10 so that the power is supplied to the device to be charged 10 by the second battery unit 104. The design of the power supply circuit is the same as that of the existing discharge circuit.

When the voltage of the second battery unit 104 is equal to or less than the first voltage threshold, and the voltage of the first battery unit 102 is greater than the voltage of the second battery unit 104, the equalization module 118, which is electrically connected to the first battery unit 102 and the second battery unit 104, can start to operate to transfer the power in the first battery unit 102 to the second battery unit 104 via the equalization module 118 to enable the voltage of the second battery unit 104 to be greater than the first voltage threshold so that the device to be charged 10 will not shut down because the battery voltage reaches the protection voltage.

As mentioned above, the first battery unit 102 may be, for example, a lithium-ion battery with a silicon negative electrode and a large capacity. Therefore, the device to be charged 10 can fully use the advantages of the large capacity of the lithium-ion battery with the silicon negative electrode based on no changing the existing discharge circuit. In addition, the battery capacity of the lithium-ion battery with the silicon negative electrode can be utilized as much as possible to maximize the energy density of the battery in the device to be charged.

It should be understood by those skilled in the art that the first battery unit 102 that is the lithium-ion battery with the silicon negative electrode, is only taken as an example. This method can also be applied to other devices to be charged with new large-capacity batteries to maximize utilize the battery capacity of the new battery with large capacity.

In some embodiments, the control module 112 may also be used to control the second battery unit 104 to stop discharging when the voltage of the first battery unit 102 is equal to or less than a predetermined second voltage threshold.

Still, an example is taken as the first battery unit 102 being the lithium-ion battery with the silicon negative electrode. The second voltage threshold may be, for example, set to 2.5V. The setting of the second voltage threshold is related to the battery type of the first battery unit 102. For example, the second voltage threshold can be set as a cut-off voltage at which the capacity of the first battery unit 102 is used up alone. But some reservations are provided; the second voltage threshold can also be slightly higher than the cut-off voltage.

In some embodiments, the control module 112 may also be used to control the equalization module 118 to equalize the voltage between the first battery unit 102 and the second battery unit 104 after the second battery unit 104 stops discharging, so that the voltage of the first battery unit 102 is equal to the voltage of the second battery unit 104.

For example, when discharging is stopped, the voltage of the second battery unit 104 is approximately the first voltage threshold (such as 3.4V), and the voltage of the first battery unit 102 is approximately the second voltage threshold (such as 2.5V), which can be equalized to one predetermined voltage value, such as 3.0V, the voltage value can be set according to actual application scenarios.

After the discharge stops, it can be recognized that the voltages of the two battery units are different, and the voltages of the two battery units are the same by the internal charging and discharging process.

In some embodiments, the control module 112 may also be used to control the equalization module 118 to equalize the voltage of the first battery unit 102 and the voltage of the second battery unit 104 to enable the voltages of the first battery unit 102 to be equal to the voltage of the second battery unit 104 after the charging circuit 106 is cut off from charging the first battery unit 1062 and the second battery unit 1064.

During the charging process, the cut-off voltage of the constant current charging stage is determined by the battery unit that first reaches the cut-off voltage and is usually determined by factors such as battery type and voltage platform. After the charging is cut off, the voltage between the first battery unit 102 and the second battery unit 104 is made the same by active equalization.

According to the device to be charged provided by the embodiments of the present disclosure, different types of batteries are used in series. In one aspect, the advantages of the large capacity of the batteries can be fully utilized, and the energy density of the battery in the device to be charged can be maximized to meet users' requirements for large-capacity batteries. In another aspect, the option of quick charging is also provided to users to meet users' requirements for quick charging.

The following are the method embodiments of the disclosure, which can be applied to the above-mentioned device embodiments. For details that are not disclosed in the method embodiments of the present disclosure, please refer to the device embodiments of the present disclosure.

Figure 8:
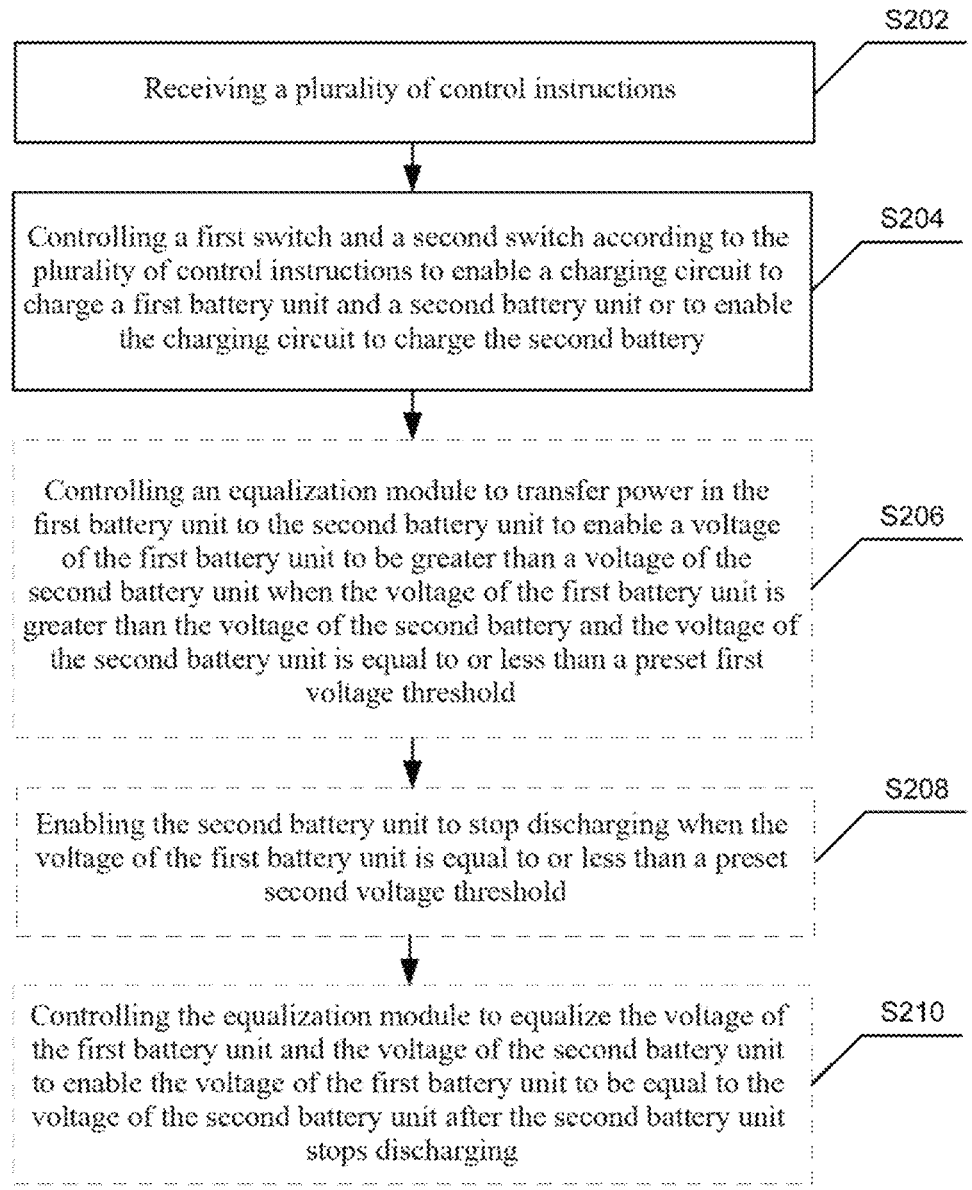
FIG. 8 is a flowchart showing a charging and discharging control method according to an exemplary embodiment.

FIG. 8 is a flowchart showing a charging and discharging control method according to an exemplary embodiment. The charging and discharging control method shown in FIG. 8 can be applied to a device to be charged that includes a first battery unit and a second battery unit connected in series in each of the above systems. The device to be charged further includes a charging circuit electrically connected to the first battery unit and the second battery unit, and a first switch and a second switch electrically connected to the charging circuit, the first battery unit, and the second battery unit. Also, a charging rate of the first battery unit is lower than a charging rate of the second battery unit.

Referring to FIG. 8, the charging and discharging control method 20 includes:

In step S202, a control instruction is received.

The control instruction may be, for example, a control instruction sent by the user through a user interface of a charging configuration provided by the device to be charged. If the user wants to obtain a larger battery capacity and chooses a normal charging mode, the user can make a configuration through the user interface to send a normal charging instruction (such as a first control instruction). If the user wants to charge quickly and chooses the quick charging mode, the user can make a configuration through the user interface to send a quick charging instruction (such as a second control instruction).

In step S204, the first switch and the second switch are controlled according to the control instruction to enable the charging circuit to charge the first battery unit and the second battery unit, or to enable the charging circuit to charge the second battery unit.

As mentioned above, in some embodiments, the first switch is connected to the first battery unit and the second battery unit in series, and the second switch is connected to a partial-series-link containing the first switch and the first battery unit, in parallel; if the user wants to obtain a larger battery capacity and chooses the normal charging mode, the user can make a configuration through the user interface to receive a normal charging instruction (such as the first control instruction) to control the first switch to be turned on and the second switch to be turned off, to enable the charging circuit to charge the first battery unit and the second battery unit. If the user wants to charge quickly and chooses the quick charging mode, the user can make a configuration through the user interface to receive a quick charging instruction (such as a second control instruction) to control the first switch to be turned off and the second switch to be turned on, to enable the charging circuit only to charge the second battery unit. Because the charging rate of the second battery unit is high, the charging circuit only charges the second battery unit, which can increase the charging speed of the device to be charged and meet the users' requirements for quick charging.

In some embodiments, the charging circuit includes a first charging circuit and a second charging circuit. When the first control instruction is received, the first charging circuit or the second charging circuit is used to charge the first battery unit and the second battery unit. When the second control instruction is received, the first charging circuit is used to charge the second battery unit. The first charging circuit is a direct charging path, and the second charging circuit includes a voltage conversion circuit.

In some embodiments, the device to be charged further includes an equalization module. When the charging circuit charges the first battery unit and the second battery unit at the same time, the charging and discharging control method 20 further includes after the charging circuit is cut off from charging the first battery unit and the second battery unit, the equalization module is controlled to equalize a voltage of the first battery unit and a voltage of the second battery unit to enable the voltage of the first battery unit to be equal to the voltage of the second battery unit.

In addition, an example is still taken that the first battery unit 102 is a lithium-ion battery with a silicon negative electrode, and the second battery unit 104 is a lithium-ion battery with a graphite negative electrode. When the first battery unit 102 and the second battery unit 104 are charged at the same time, the voltage rising speed of the second battery unit 104 (the lithium-ion battery with the graphite negative electrode) is usually higher than that of the first battery unit 102 (the lithium-ion battery with the silicon negative electrode). To speed up the overall charging speed, the voltage of the lithium-ion battery with the silicon negative electrode is slowly approached to the lithium-ion battery with the graphite negative electrode. When the detection circuit 116 detects that the voltage of the second battery unit 104 is greater than the voltage of the first battery unit 102, the control module 112 can control the equalization module 118 to enable the second battery unit 104 to charge the first battery unit 102. For example, the second battery unit 104 can be used to charge the first battery unit 102 with a low current. Namely, while the second battery unit 104 receives the power provided by the power supply unit, the second battery unit 104 also charges the first battery unit with a low current via the equalization module 118. During the charging process, the first battery unit 102 simultaneously receives the power provided by the power supply device and the second battery unit 104. Wherein, the aforementioned low current does not exceed the maximum discharge current of the second battery unit 104, and a sum of the low current and the charging current provided by the power supply device for the first battery unit 102 does not exceed the maximum charge current that the first battery unit 102 can withstand.

In some embodiments, the first battery unit is a lithium-ion battery with a silicon negative electrode. The silicon negative electrode may include one or more mixtures of silicon, silicon carbide, and silicon monoxide, or the silicon negative electrode may include a mixture of graphite and one or more of silicon, silicon carbide, and silicon monoxide.

In some embodiments, the second battery unit is a lithium-ion battery with a graphite negative electrode.

Further, in some embodiments, the charging and discharging control method 20 further includes the following steps to supply power to the device to be charged via the second battery unit:

In step S206, when the voltage of the first battery unit is greater than the voltage of the second battery and the voltage of the second battery unit is equal to or less than a predetermined first voltage threshold, the equalization module is controlled to transfer power in the first battery unit to the second battery unit, to enable the voltage of the second battery unit to be greater than the first voltage threshold.

As described above, the first voltage threshold may be set to, for example, the protection shutdown voltage set by the smart terminal system as 3.4V.

In step S208, when the voltage of the first battery unit is equal to or less than a predetermined second voltage threshold, the second battery unit is stopped from discharging.

As mentioned above, an example is still taken that the first battery unit 102 is a lithium-ion battery with a silicon negative electrode. The second voltage threshold may be, for example, set to 2.5V. The setting of the second voltage threshold is related to the battery type of the first battery unit 102. For example, the second voltage threshold can be set as the cut-off voltage at which the capacity of the first battery unit 102 is used up alone. But some reservations are provided; the second voltage threshold can also be slightly higher than the cut-off voltage.

In step S210, after the second battery unit is stopped from discharging, the equalization module is controlled to equalize the voltage of the first battery unit and the voltage of the second battery unit, so that the voltage of the first battery unit is equal to the voltage of the second battery unit.

As mentioned above, when the discharge is stopped, the voltage of the second battery unit 104 is approximately the first voltage threshold (such as 3.4V), and the voltage of the first battery unit 102 is approximately the second voltage threshold (such as 2.5V, taking the lithium-ion battery with the silicon negative electrode as an example), which can be equalized to a predetermined voltage value, such as 3.0V. The voltage value can be set according to actual application scenarios.

When the discharge stops, it can be recognized that the voltages of the two battery units are different, and the voltages of the two battery units are the same by the internal charging and discharging process.

According to the charging and discharging control method provided by the embodiments of the present disclosure, different types of batteries are used in series. In one aspect, the advantages of the large capacity of the batteries can be fully utilized, and the energy density of the battery in the device to be charged can be maximized to meet users' requirements for large-capacity batteries. In another aspect, the option of quick charging is also provided to users to meet users' requirements for quick charging.

The exemplary embodiments of the present disclosure have been specifically shown and described above. It should be understood that the present disclosure is not limited to the detailed structure, arrangement, or implementation method, described herein. On the contrary, the present disclosure intends to cover various modifications and equivalent arrangements included in the spirit and scope of the appended claims.

What is claimed is:

1. A device to be charged, comprising:
a first battery unit and a second battery unit coupled in series;
a charging circuit electrically connected to the first battery unit and the second battery unit;
a first switch and a second switch electrically connected to the charging circuit, the first battery unit, and the second battery unit, wherein the first switch is coupled to the first battery unit and the second battery unit in series, and wherein the second switch is coupled to a partial-series-link containing the first switch and the first battery unit, in parallel; and
a control module electrically connected to the charging circuit, the first switch, and the second switch to control the first switch and the second switch according to a plurality of control instructions received to enable the charging circuit to charge the first battery unit and the second battery unit or to enable the charging circuit to charge the second battery unit;
wherein a charging rate of the first battery unit is less than a charging rate of the second battery unit.

2. The device to be charged as claimed in claim 1, wherein the plurality of control instructions comprises a first control instruction and a second control instruction; the control module is configured to control the first switch to be turned on and the second switch to be turned off to enable the charging circuit to charge the first battery unit and the second battery unit in response to the first control instruction being received and to control the first switch to be turned off and the second switch to be turned on to enable the charging circuit to charge the second battery unit in response to the second control instruction being received.

3. The device to be charged as claimed in claim 2, wherein the charging circuit comprises a first charging circuit and a second charging circuit; and the control module is configured to enable the first charging circuit or the second charging circuit to charge the first battery unit and the second battery unit in response to the first control instruction being received and to enable the first charging circuit to charge the second battery unit in response to the second control instruction being received;
wherein the first charging circuit is a direct charging path, and the second charging circuit comprises a voltage conversion circuit.

4. The device to be charged as claimed in claim 1, further comprising:
a detection circuit electrically connected to the first battery unit and the second battery unit to detect a voltage of the first battery unit and a voltage of the second battery unit; and
an equalization module electrically connected to the first battery unit and the second battery unit to equalize the voltage of the first battery unit and the voltage of the second battery unit;
wherein during power supplied to the device to be charged by the second battery unit, in response to the detection circuit detecting the voltage of the first battery unit greater than the voltage of the second battery unit and the voltage of the second battery unit equal to or less than a predetermined first voltage threshold, the control module is further configured to control the equalization module to transfer power in the first battery unit to the second battery unit to enable the voltage of the second battery unit to be greater than the first voltage threshold.

5. The device to be charged as claimed in claim 4, wherein the control module is further configured to control the second battery unit to stop discharging in response to the voltage of the first battery unit equal to or less than a predetermined second voltage threshold.

6. The device to be charged as claimed in claim 5, wherein the control module is further configured to control the equalization module to equalize the voltage of the first battery unit and the voltage of the second battery unit to enable the voltage of the first battery unit to be equal to the voltage of the second battery unit in response to the second battery unit stopping discharging.

7. The device to be charged as claimed in claim 1, further comprising:
a detection circuit electrically connected to the first battery unit and the second battery unit to detect a voltage of the first battery unit and a voltage of the second battery unit; and
an equalization module electrically connected to the first battery unit and the second battery unit to equalize the voltage of the first battery unit and the voltage of the second battery unit;
wherein during charging the first battery unit and the second battery unit simultaneously, in response to the detection circuit detecting the voltage of the second battery unit greater than the voltage of the first battery unit, the control module is further configured to control the equalization module to enable the second battery unit to charge the first battery unit with a low current.

8. The device to be charged as claimed in claim 1, wherein in response to the charging circuit being cut off from charging the first battery unit and the second battery unit, the control module is further configured to control the equalization module to equalize a voltage of the first battery unit and a voltage of the second battery unit to enable the voltage of the first battery unit to be equal to the voltage of the second battery unit.

9. The device to be charged as claimed in claim 1, wherein the first battery unit is a lithium-ion battery with a silicon negative electrode, the silicon negative electrode comprises one or more mixtures of silicon, silicon carbide, and silicon monoxide, or the silicon negative electrode comprises a mixture of graphite and one or more of silicon, silicon carbide, and silicon monoxide.

10. The device to be charged as claimed in claim 1, wherein the second battery unit is a lithium-ion battery with a graphite negative electrode.

11. A charging and discharging control method, applied in a device to be charged comprising a first battery unit and a second battery unit coupled in series, a charging circuit electrically connected to the first battery unit and the second battery unit, and a first switch and a second switch electrically connected to the charging circuit, the first battery unit, and the second battery unit, wherein the first switch is coupled to the first battery unit and the second battery unit in series, and wherein the second switch is coupled to a partial-series-link containing the first switch and the first battery unit, in parallel, and wherein the method comprises:
receiving a plurality of control instructions; and
controlling the first switch and the second switch according to the plurality of control instructions to enable the charging circuit to charge the first battery unit and the second battery unit or to enable the charging circuit to charge the second battery unit;
wherein a charging rate of the first battery unit is less than a charging rate of the second battery unit.

12. The method as claimed in claim 11, wherein the plurality of control instructions comprises a first control instruction and a second control instruction; and the controlling the first switch and the second switch according to the plurality of control instructions to enable the charging circuit to charge the first battery unit and the second battery unit or to enable the charging circuit to charge the second battery unit comprises:
controlling the first switch to be turned on and the second switch to be turned off to enable the charging circuit to charge the first battery unit and the second battery unit in response to the first control instruction being received; and
controlling the first switch to be turned off and the second switch to be turned on to enable the charging circuit to charge the second battery unit in response to the second control instruction being received.

13. The method as claimed in claim 12, wherein the charging circuit comprises a first charging circuit and a second charging circuit, and the method further comprises:
enabling the first charging circuit or the second charging circuit to charge the first battery unit and the second battery unit in response to the first control instruction being received; and enabling the first charging circuit to charge the second battery unit in response to the second control instruction being received;
wherein the first charging circuit is a direct charging path, and the second charging circuit comprises a voltage conversion circuit.

14. The method as claimed in claim 11, wherein the device to be charged further comprises an equalization module, and the method further comprises:
during power supplied to the device to be charged by the second battery unit, in response to a voltage of the first battery unit greater than a voltage of the second battery unit and the voltage of the second battery unit is equal to or less than a predetermined first voltage threshold, controlling the equalization module to transfer power in the first battery unit to the second battery unit to enable the voltage of the second battery unit to be greater than the first voltage threshold.

15. The method as claimed in claim 14, further comprising: enabling the second battery unit to stop discharging in response to the voltage of the first battery unit equal to or less than a predetermined second voltage threshold.

16. The method as claimed in claim 15, further comprising: controlling the equalization module to equalize the voltage of the first battery unit and the voltage of the second battery unit to enable the voltage of the first battery unit to be equal to the voltage of the second battery unit in response to the second battery unit stopping discharging.

17. The method as claimed in claim 11, wherein the device to be charged further comprises an equalization module, and the method further comprises:
during charging the first battery unit and the second battery unit simultaneously, in response to a voltage of the second battery unit greater than a voltage of the first battery unit, controlling the equalization module to enable the second battery unit to charge the first battery unit with a low current.

18. The method as claimed in claim 11, further comprising: in response to the charging circuit being cut off from charging the first battery unit and the second battery unit, controlling the equalization module to equalize a voltage of the first battery unit and a voltage of the second battery unit to enable the voltage of the first battery unit to be equal to the voltage of the second battery unit.

19. The method as claimed in claim 11, wherein the first battery unit is a lithium-ion battery with a silicon negative electrode, the silicon negative electrode comprises one or more mixtures of silicon, silicon carbide, and silicon monoxide, or the silicon negative electrode comprises a mixture of graphite and one or more of silicon, silicon carbide, and silicon monoxide.

20. The method as claimed in claim 11, wherein the second battery unit is a lithium-ion battery with a graphite negative electrode.

\* \* \* \* \*